(12) United States Patent
Griffiths et al.

(10) Patent No.: US 10,462,307 B2
(45) Date of Patent: Oct. 29, 2019

(54) SYSTEM AND METHOD FOR MAINTAINING SHARING GROUPS IN A SERVICE DELIVERY SYSTEM

(71) Applicant: Manitoba Telecom Services Inc., Winnipeg (CA)

(72) Inventors: Brett Griffiths, Winnipeg (CA); Anna Schellenberg, Winnipeg (CA); April Monkman, Winnipeg (CA); Janet Balkaran, Winnipeg (CA); Kelly Balkwill, Winnipeg (CA); Hyon Na, San Francisco, CA (US)

(*) Notice: Subject to any disclaimer, the term of this patent is extended or adjusted under 35 U.S.C. 154(b) by 165 days.

(21) Appl. No.: 15/358,713

(22) Filed: Nov. 22, 2016

(65) Prior Publication Data
US 2018/0146099 A1 May 24, 2018

(51) Int. Cl.
*H04M 15/00* (2006.01)
*G06F 16/93* (2019.01)
*H04L 12/14* (2006.01)
*H04W 4/24* (2018.01)

(52) U.S. Cl.
CPC .......... *H04M 15/745* (2013.01); *G06F 16/93* (2019.01); *H04L 12/14* (2013.01); *H04M 15/43* (2013.01); *H04M 15/72* (2013.01); *H04W 4/24* (2013.01)

(58) Field of Classification Search
CPC ...... G04M 15/745; G06F 3/0482; G06F 9/46; G06F 16/93; H04L 67/10; H04L 9/28
USPC .......................................................... 707/608
See application file for complete search history.

(56) References Cited

U.S. PATENT DOCUMENTS

| | | | |
|---|---|---|---|
| 9,820,361 B1* | 11/2017 | Turvy | H04L 12/2818 |
| 2008/0189184 A1* | 8/2008 | Kubo | G06Q 20/00 |
| 2009/0327714 A1* | 12/2009 | Yaghmour | H04L 9/28 |
| 2013/0132854 A1* | 5/2013 | Raleigh | G06F 3/0482 |
| 2013/0191853 A1* | 7/2013 | Harada | G06F 9/46 |
| 2014/0195102 A1* | 7/2014 | Nathanson | H04W 4/046 |
| 2015/0067028 A1* | 3/2015 | Kumar | H04L 67/10 |

FOREIGN PATENT DOCUMENTS

CA 2268550 * 4/1999 .............. H04J 3/16

* cited by examiner

*Primary Examiner* — Shahid A Alam
(74) *Attorney, Agent, or Firm* — Pearne & Gordon LLP

(57) ABSTRACT

In a service delivery system, a computing system is provided for maintaining membership in a sharing group associated with a sharable service. The system includes a CRM module generating a user interface for displaying current membership in the sharing group and receiving, via the user interface, instructions to modify the current membership. The CRM module automatically generates and inserts into a transaction table at least one pending modification transaction for the sharing group in accordance with the instructions, and a billing module comprising a billing database storing associations between one or more member services and the sharing group modifies the associations in the billing database in accordance with the at least one pending transaction. A computer-implemented method and computer-readable medium are also provided.

10 Claims, 21 Drawing Sheets

FIG. 5b

| Create DSG Transaction - Windows Internet Explorer provide... |
|---|
| Create DSG Transaction |
| DSG Name: Total Internet |
| Owner Service Id: DUCK.DONALD@MTS. |
| Member Service Id: 2047610553 |
| Start Date: 4/6/2015 03:12:59 PM |
| End Date: |
| Channel: MTS Exclusive |
| Requested Due Date: 4/6/2015 03:12:59 PM |
| Action Code: Add |
| Status: New |
| SMS Notify: ✓ |
| New  Delete  Save  Submit  Close |

| Field Name | Parent Element | Field Type | Description |
|---|---|---|---|
| PIN_FLD_POID | None(Root element) | Poid | The paying parent |
| PIN_FLD_GROUP_OBJ | None(Root element) | Array | Type only poid object. Type is either /group/sharing/discounts, /group/sharing/charges (new-style sponsorship), /group/sharing/monitor or /group/sharing/profiles object.<br>For discount sharing group set this to /group/sharing/discounts |
| PIN_FLD_PROGRAM_NAME | None(Root element) | String | Program Name set it to AIA |
| PIN_FLD_DESCR | None(Root element) | String | Description text to be recorded in /event |
| PIN_FLD_ORDER_ID | None(Root element) | Date/Time | The Order No from AIA |
| PIN_FLD_SERVICE_OBJ | None(Root element) | Array | The service Poid i.e. the owner of the sharing group object to be modify. |
| PIN_FLD_LOGIN | None(Root element) | String | The service Login i.e. the owner of the sharing group object to be modify. |
| PIN_FLD_MEMBERS – Array with list of members to be added ||||
| PIN_FLD_SERVICE_OBJ | PIN_FLD_MEMBERS | Poid | Member service object. |
| PIN_FLD_LOGIN | PIN_FLD_MEMBERS | String | The subscription Login, required if the SERVICE_OBJ is not supplied. |
| PIN_FLD_ACTION_NAME | PIN_FLD_MEMBERS | String | The action name. Valid actions are ADD\|DELETE |

FIG. 13a

| Field Name | Parent Element | Field Type | Description |
| --- | --- | --- | --- |
| PIN_FLD_POID | None(Root element) | Poid | The input Poid or an error Poid. |
| PIN_FLD_RESULTS | None(Root element) | Array | |
| PIN_FLD_POID | PIN_FLD_RESULTS | Poid | Poid of the event object created |
| PIN_FLD_SERVICE_OBJ | PIN_FLD_RESULTS | Poid | The service owner of the sharing group object. |
| PIN_FLD_ORDER_ID | PIN_FLD_RESULTS | String | The input Order No. |
| PIN_FLD_LOGIN | PIN_FLD_RESULTS | String | The input or found subscription Login. |
| PIN_FLD_SERVICES | None(Root element) | Array | Modified Services array. This would include all the member and parent service that is impacted by a discount sharing group modify action |
| PIN_FLD_SERVICE_OBJ | PIN_FLD_SERVICES | Poid | The service poid that is being updated. |
| PIN_FLD_DEAL_INFO | PIN_FLD_SERVICES | Substruct | List of updated purchased products |
| PIN_FLD_PRODUCTS | PIN_FLD_SERVICES .PIN_FLD_DEAL_INFO | Array | Modified Products Array |
| PIN_FLD_FROM_OBJ | PIN_FLD_SERVICES .PIN_FLD_DEAL_INFO PIN_FLD_PRODUCTS | Poid | The original purchased-product Poid. |
| PIN_FLD_OFFERING_OBJ | PIN_FLD_SERVICES .PIN_FLD_DEAL_INFO PIN_FLD_PRODUCTS | Poid | The new purchased-product Poid. |
| PIN_FLD_DISCOUNTS | PIN_FLD_SERVICES .PIN_FLD_DEAL_INFO | Array | Modified Discounts Array |
| PIN_FLD_FROM_OBJ | PIN_FLD_SERVICES .PIN_FLD_DEAL_INFO PIN_FLD_DISCOUNTS | Poid | The original purchased-discount Poid. |
| PIN_FLD_OFFERING_OBJ | PIN_FLD_SERVICES .PIN_FLD_DEAL_INFO PIN_FLD_DISCOUNTS | Poid | The new purchased-discount Poid. |
| PIN_FLD_ERROR_INFO | None(Root element) | Array | Available only when the operation failed - error info. |

SYSTEM AND METHOD FOR MAINTAINING SHARING GROUPS IN A SERVICE DELIVERY SYSTEM

FIELD OF THE INVENTION

The following relates generally to electronic data processing, and more particularly to a system and method for maintaining sharing groups in a service delivery system.

BACKGROUND OF THE INVENTION

Many providers of telecommunications services such as Internet access offer subscribers the option of a discount for sharing data usage with other related subscribers. For example, a particular subscriber may order a shared data service in connection with his or her mobile device account and may request that additional mobile devices used by the subscriber's family members be associated with the shared data service. As a result, the data service purchased by the subscriber is then shared by the mobile devices of the family members such that, at billing time, total data usage of the family members and the subscriber is considered consolidated under the shared data service instead of billed individually under each family member's device.

Typically, to establish associations between the subscriber's shared service and the devices that are to share in the service, the subscriber must communicate with the customer service department of the telecommunications service provider. This may be done by telephone or via the Internet, and involves the subscriber requesting that a new device, such as a family member's mobile data number (MDN), be associated with or "added" to the shared service.

Conventional service delivery systems employed by telecommunications service providers to sign up, provision and bill subscribers include a customer relationship management application (CRM) such as a Siebel CRM. A customer service representative interacts with the CRM application to establish and maintain subscribers' accounts. Based on the interactions the customer service representative has with the CRM system, whether to establish a new subscriber, to modify the services to be accessed by a particular subscriber, or to do some other customer service operation, the CRM system will make modifications and additions to records in its own CRM database and will request modifications and additions of other modules in the service delivery system, such as billing modules, orchestration modules, provisioning modules, and the like. In some service delivery systems supporting multiple complex operations between various subsystems, the communications between the various modules in the service delivery system may be conducted using messaging via a middleware application, such as an Oracle Application Integration Architecture (AIA) module.

With such a conventional service delivery system, when a customer service representative is asked by a subscriber owner of a sharable service, such as a sharable data service, to link that sharable service with a particular other subscriber's device in order to enable the other subscriber to share in the service, the subscriber owner instructs the customer service representative with the MDN (mobile device number i.e., the phone number) of the other subscriber's device. In turn, the customer service representative goes through a process of creating an order using the CRM application to add the sharable service to the other subscriber's device.

Creating an order is complex process in a CRM system that allows a customer service representative to create, modify or terminate a customer's service. Generating a modification order, for example, typically requires the system to generate a user interface with a complex series of screens, business logic and prompts in order to guide the customer service representative through the order creation process. Once the user has the completed the complex sequence of entries for a given order, the order is submitted for processing. At this point, the system decomposes the order into a series of several transactions for causing the various components of the customer management, billing and provisioning platforms to react in some way to put their respective aspects of the overall order into place.

While a subscriber requesting a modification such as this does not have to know how the service delivery system enables a customer service representative to carry out the subscriber's instructions, the subscriber typically has to wait for minutes for each order the customer service representative prepares and submits to the service deliver system. Any waiting can be frustrating for a subscriber, but it can particularly frustrating to wait through the preparation of several such orders when the subscriber is requesting several modifications to the membership of the sharing group. For example, adding one or more members and/or removing one or more members requires a multi-minute order to be prepared and submitted in respect of each of the members. As such, because of the ways typical service delivery systems are constructed, and how their various subsystems are to be addressed and integrated, the typical process of modifying members of a sharing group takes far longer and is far more frustrating than the customer would normally perceive is necessary.

Furthermore, in addition to the speed or turnaround factor at the customer service level, orders once submitted typically implicate and communicate with several of the subsystems or require a development consideration at the CRM level as to all of the subsystems that could be implicated or communicated with, even for simple modifications. The system resources that are consumed in time and processing therefore can outweigh the time and processing actually needed to make a simple intended modification such as adding or removing a user from a sharing group. Furthermore, in the event that a subsystem is itself upgraded or otherwise modified, the ordering process must be carefully scrutinized for possible upgrading, even for use cases that involving simply adding or removing members from a sharing group. This can increase development and upgrading time and cost.

It is an object of an aspect of the following to provide a method and system that can streamline the process of modifying membership in discount sharing groups, so that the customer service process is simplified, so that modifications can be done faster, and so that modifications only implicate the required subsystem(s) and system resources that are required.

SUMMARY OF THE INVENTION

In accordance with an aspect, there is provided, in a service delivery system, a computer-implemented method for maintaining membership in a sharing group associated with a sharable service, the method comprising generating a user interface for displaying current membership in the sharing group; receiving, via the user interface, an instruction to modify the current membership; and in accordance with the instruction, automatically: generating and inserting into a transaction table at least one pending modification transaction for the sharing group; and modifying associations in a billing database between one or more member services and the sharing group in accordance with the at least one pending modification transaction.

The instruction to modify the membership may include one or more instructions to add a member to the membership of the sharing group and/or one or more instructions to remove a member from the membership.

In an embodiment, prior to modifying associations, the method comprises constructing a payload based on all modification transactions for the sharing group; and generating and inserting into a middleware messaging queue a message comprising the payload, wherein modifying associations comprises processing the message to extract the payload.

In accordance with another aspect, there is provided, in a service delivery system, a computing system for maintaining membership in a sharing group associated with a sharable service, the system comprising a CRM module generating a user interface for displaying current membership in the sharing group and receiving, via the user interface, instructions to modify the current membership, the CRM module automatically generating and inserting into a transaction table at least one pending modification transaction for the sharing group in accordance with the instructions; and a billing module comprising a billing database storing associations between one of more member services and the sharing group, the billing module modifying the associations in the billing database in accordance with the at least one pending transaction.

In an embodiment, the CRM module further constructs a payload based on all pending modification transactions for the sharing group and generates and inserts, into a middleware messaging queue, a message comprising the payload; wherein the system further comprises a middleware module comprising the middleware messaging queue and processing the queued message, the middleware module further instructing the billing module to conduct the modifying.

In accordance with another aspect, there is provided a non-transitory computer readable medium embodying a computer program executable on a computing system for maintaining membership in a sharing group associated with a sharable service, the computer program comprising computer program code for generating a user interface for displaying current membership in the sharing group; computer program code for receiving, via the user interface, an instruction to modify the current membership; and computer program code for automatically, in accordance with the instruction: generating and inserting into a transaction table at least one pending modification transaction for the sharing group; and modifying associations in a billing database between one or more member services and the sharing group in accordance with the at least one pending modification transaction.

In an embodiment, the non-transitory computer readable medium further comprises computer program code for, prior to modifying associations: constructing a payload based on all pending modification transactions for the sharing group; and generating and inserting into a middleware messaging queue a message comprising the payload, wherein modifying associations comprises processing the message to extract the payload.

The system and method according to the invention provide a customer service representative with a simplified 'member maintenance function' that enables the customer service representative to identify and select a sharing group and to simply add and remove members to and from the sharing group at the asset level and outside of an order. Such a function can be used quite flexibly, and multiple modifications to the membership can take a matter of seconds rather than minutes for each modification. Furthermore, the user interface and the related functions are straightforward to maintain from a service delivery system perspective. At the CRM level only the subsystems involved with modifying membership in a sharing group are implicated and involved in the actual modification, preserving time and system resources such as space in messaging queues and network usage. Furthermore, the generation and insertion of transactions into the transactions table provides the further benefit of maintaining an auditable history of the addition(s) and removal(s).

BRIEF DESCRIPTION OF THE DRAWINGS

Embodiments of the invention will now be described with reference to the appended drawings in which:

FIGS. 3 through 12 are user interface components generated and displayed by the system, according to an embodiment;

FIG. 13a is a table listing components of an input specification for a wrapper containing instructions to a billing module, according to an embodiment;

FIG. 13b is a table listing components of an output specification for the wrapper provided by the billing module in response to instructions to the billing module, according to an embodiment.

DETAILED DESCRIPTION

Figure 1:
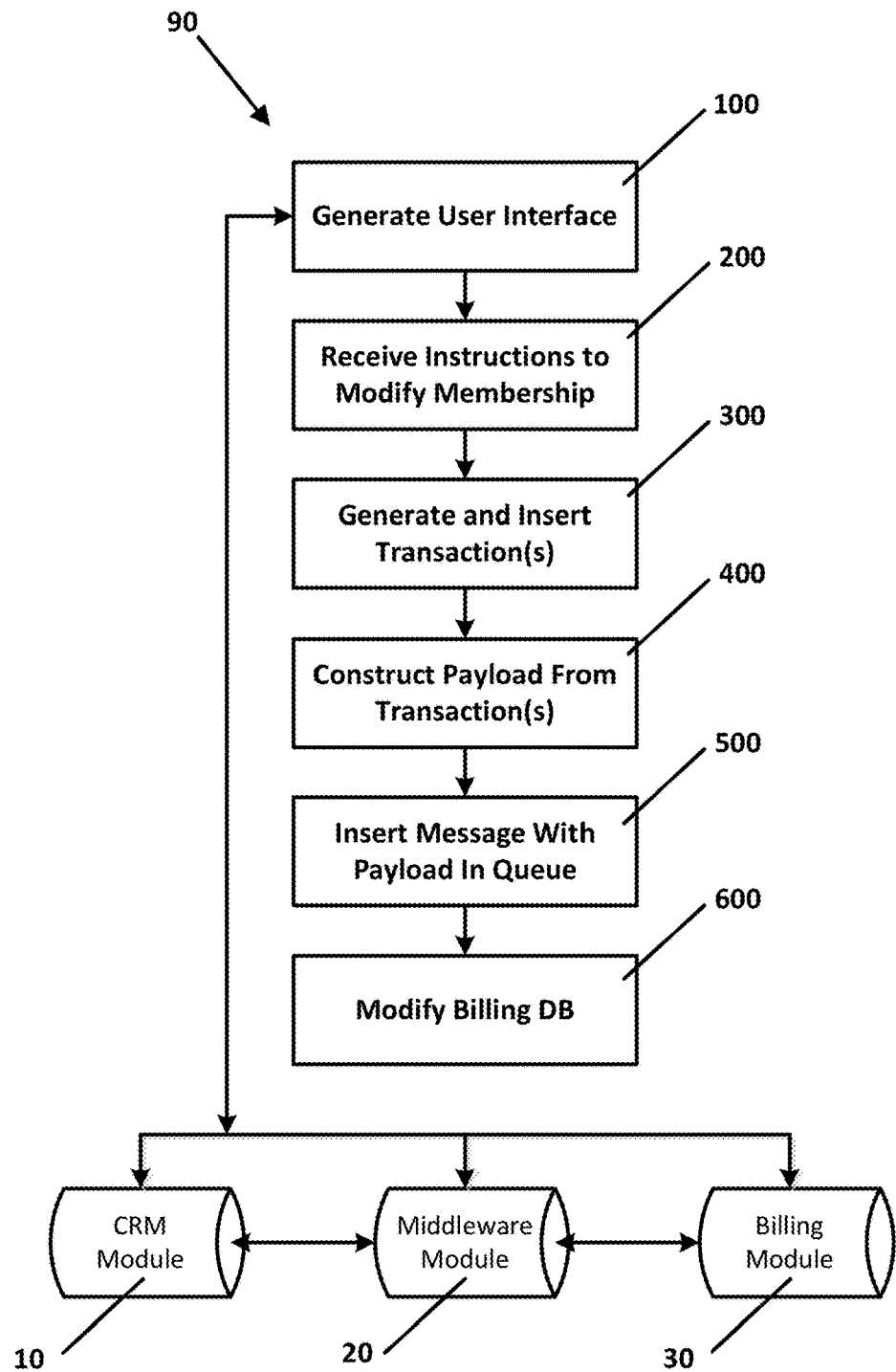
FIG. 1 is a flowchart depicting steps in a method and components of a system according to an embodiment.

FIG. 1 is a flowchart depicting steps in a process 90 for maintaining membership in a sharing group associated with a sharable service. In addition, FIG. 1 shows modules that may be accessed while carrying out the steps, in this embodiment. In particular, there is provided a customer relationship management (CRM) module 10 (such as Siebel CRM) that includes a CRM application and a CRM database, a middleware module 20 (such as an Oracle Application Integration Architecture, or AIA, module) that includes a middleware application and a middleware database, and a billing module 30 (such as an Oracle Billing and Resource Management, or BRM, module) including a billing application and a billing database.

Each of modules 10, 20 and 30 include special purpose, specifically programmed client computers and/or server computers coupled to each other for facilitating communications via a wired or wireless communications network such as a local area network, wide area network, the Internet or other proprietary or publicly-accessible networks. For the sake of brevity, these computers are referred to herein by entity name. For example, customer relationship management (CRM) module 10 refers to one or more computers e.g., servers and/or client computers executing a CRM module 10 including one or more applications and databases. Similarly, middleware module 20 refers to one or more computers, e.g., servers executing a middleware module 20 including one or more applications and databases. Further, billing module 30 refers to one or more computers, e.g., servers executing a billing module 30 including one or more applications and databases. Communications between the client and server computers, particularly when traversing one or more publicly-accessible networks, may be encrypted to ensure the security of the information incorporated therein.

Figure 2:
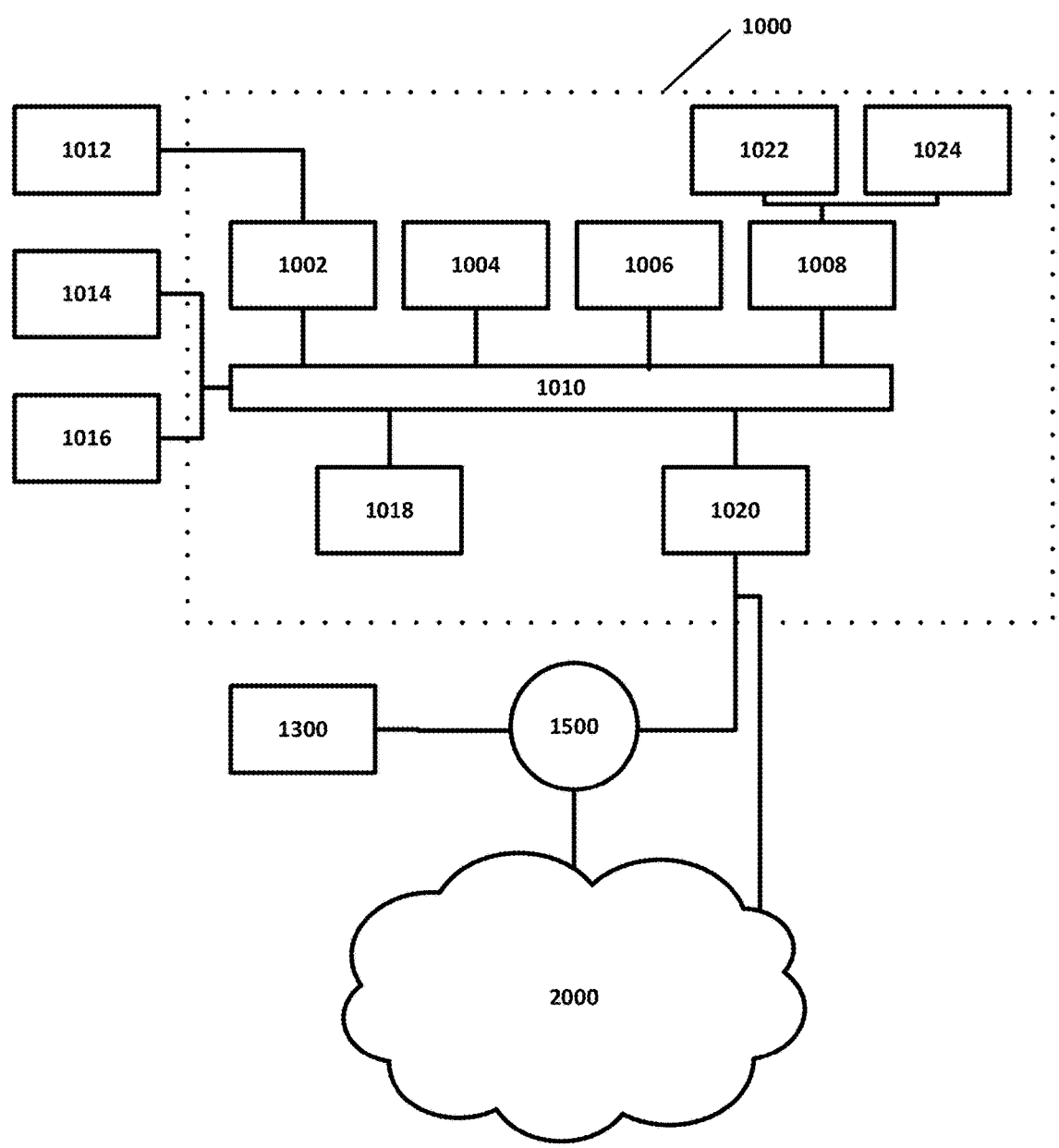
FIG. 2 is a schematic diagram of an aspect of a computing environment which may be used to implement one or more embodiments of the method.

In this embodiment, process 90 is executed on one or more special purpose computing systems 1000 such as that shown in FIG. 2. The computing system 1000 may be incorporated into CRM module 10, middleware module 20, billing module 30, or other system of the service delivery system.

Computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The computing system 1000 also includes a disk controller 1008 coupled to the bus 1010 to control one or more storage devices for storing information and instructions, such as a magnetic hard disk 1022, and a removable media drive 1024 (e.g., floppy disk drive, read-only compact disc drive, read/write compact disc drive, compact disc jukebox, tape drive, and removable magneto-optical drive). The storage devices may be added to the computing system 1000 using an appropriate device interface (e.g., small computing system interface (SCSI), integrated device electronics (IDE), enhanced-IDE (E-IDE), direct memory access (DMA), or ultra-DMA).

The computing system 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computing system 1000 may also include a display controller 1002 coupled to the bus 1010 to control a display 1012, such as a liquid crystal display (LCD) screen, for displaying information to a computer user. The computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. In addition, a printer may provide printed listings of data stored and/or generated by the computing system 1000.

The computing system 1000 performs a portion or all of the processing steps discussed herein in response to the processor 1018 executing one or more sequences of one or more instructions contained in a memory, such as the main memory 1004. Such, instructions may be read into the main memory 1004 from another computer readable medium, such as a hard disk 1022 or a removable media drive 1024. One or more processors in a multi-processing arrangement may also be employed to execute the sequences of instructions contained in main memory 1004. In alternative embodiments, hard-wired circuitry may be used in place of or in combination with software instructions.

As stated above, the computing system 1000 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e,g., CD-ROM), or any other optical medium, punch cards, paper tape, or other physical medium with patterns of holes, a carrier wave (described below), or any other medium from which a computer can read.

Stored on any one or on a combination of computer readable media, includes software for controlling the computing system 1000, for driving a device or devices to perform the functions discussed herein, and for enabling the computing system 1000 to interact with a human user (e.g., print production personnel). Such software may include, but is not limited to, device drivers, operating systems, development tools, and applications software. Such computer readable media further includes the computer program product for performing all or a portion (if processing is distributed) of the processing performed discussed herein.

The computer code devices of discussed herein may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

A computer readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications.

Various forms of computer readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computing system 1000 may receive the data on the telephone line and use an infrared transmitter to convert the data to an infrared signal. An infrared detector coupled to the bus 1010 can receive the data carried in the infrared signal and place the data on the bus 1010. The bus 1010 carries the data to the main memory 1004, from which the processor 1018 retrieves and executes the instructions.

The instructions received by the main memory 1004 may optionally be stored on storage device 1022 or 1024 either before or after execution by processor 1018.

The computing system 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices, including without limitation to enable the flow of electronic information. For example, the network link may provide a connection to another computer through a local network 1500 (e.g., a LAN) or through equipment operated by a service provider, which provides communication service through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc). The signals through the various networks and the signals on the network link and through the communication interface 1020, which carry the digital data to and from the computing system 1000 may be implemented in baseband signals, or carrier wave based signals. The baseband signals convey the digital data as unmodulated electrical pulses that are descriptive of a stream of digital data bits, where the term 'bits' is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system 1000, such as those that are not interacted with directly by a human user through a graphical or text user interface, may be used to implement process 90.

The electronic data store implemented in the database described herein may be one or more of a table, an array, a database, a structured data file, an XML file, or some other functional data store, such as hard disk 1022 or removable media 1024.

During process 90, a user interface for displaying current membership in the sharing group is generated (step 100). An instruction is received via the user interface to modify the current membership (step 200). In accordance with the instruction, at least one pending modification transaction for the sharing group is automatically generated and inserted into a transaction table (step 300). A payload is then constructed based on all pending modification transactions for the sharing group (step 400).

Pursuant to the payload having been constructed, a message comprising the payload is generated and inserted into a middleware messaging queue (Step 500). The message in the queue is then processed, which in this embodiment includes instructing the billing module 30 to modify associations in the billing database of the billing module 30 between one or more member services and the sharing group in accordance with the payload (step 600).

Figure 3:
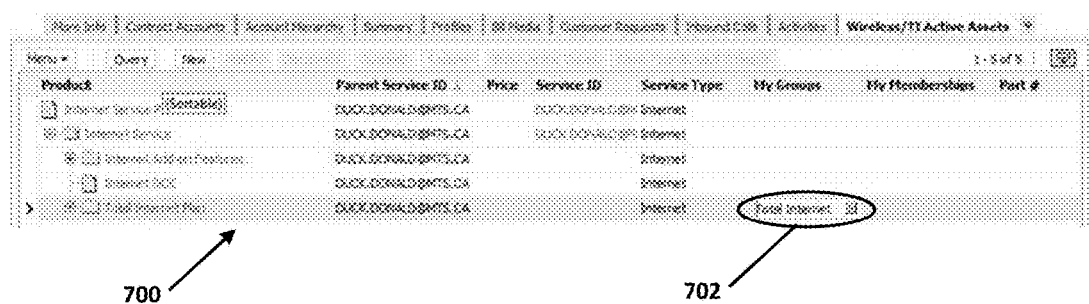
Figure 4:
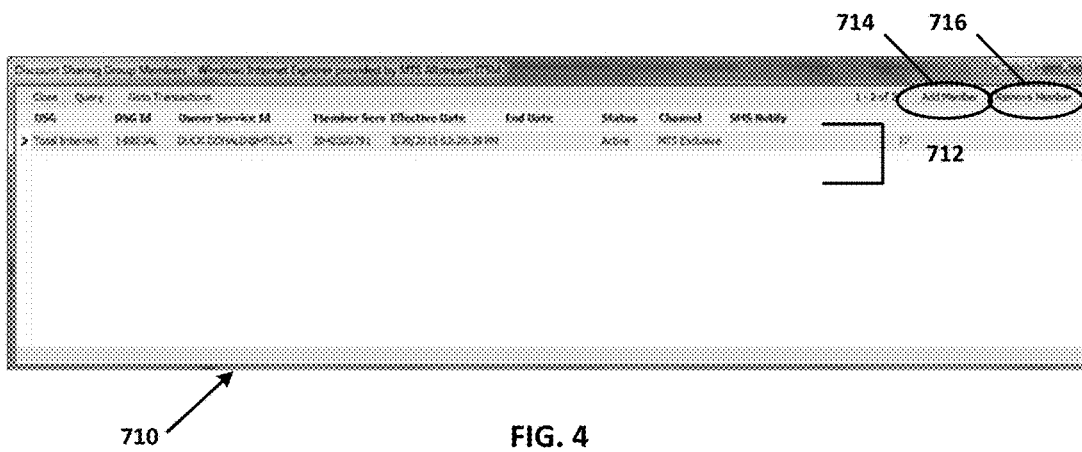

Turning to FIGS. 3 through 5, in an embodiment, CRM module 10 generates the user interface component for displaying current membership in the sharing group at the request of a customer service representative. The request may be initiated from an asset view user interface component 700 generated and displayed by CRM module 10. In this embodiment, asset view 700 displays a list of assets for a particular subscriber, including a sharable service called Total Internet. In this embodiment, the Total Internet service is a cross line-of-business service that provisions the subscriber with unlimited home and mobile internet access for all of the subscriber's devices. In this embodiment, the Total Internet service is a sharable service, such that other subscribers may be configured to share in the unlimited home and mobile internet access for their respective device(s). As Total Internet is a sharable service it has already been associated with a sharing group. As such, user interface component 700 for the subscriber includes a sharing group entry 702 in the My Groups column, called Total Internet. This Total Internet entry is selectable by the customer service representative in order to cause CRM module 10 to generate the user interface component for displaying current membership in the Total Internet discount sharing group whose owner is the particular subscriber in respect of whom the user interface component 700 is being displayed.

In this embodiment, in addition to other tables, in order to maintain records of memberships in sharing groups that reflect the records of these memberships in the sharing groups maintained by billing module 30, the CRM database of CRM module 10 contains three tables: a Sharing Group Definition table having fields as shown in Table 1 below, a Member/Owner Relationships table having fields as shown in Table 2 below, and a Sharing Group Transactions table having fields as shown in Table 3 below. In this embodiment, the fields set out in Tables 1 to 3 refer to a discount sharing group, but the tables may be used for sharing groups other than strictly discount sharing groups.

TABLE 1

Sharing Group Definition

| Name | Physical Type | Length |
| --- | --- | --- |
| ASSOC_LEVEL | Varchar | 30 |
| CONFLICT_ID | Varchar | 15 |
| CREATED | UTC Date Time | 7 |
| CREATED_BY | Varchar | 15 |
| DB_LAST_UPD | UTC Date Time | 7 |
| DB_SRC_UPD_SRC | Varchar | 15 |
| LAST_UPD | UTC Date Time | 7 |
| LAST_UPD_BY | Varchar | 15 |
| MAX_MEMBERS | Number | 22 |
| MEMBER_PROD_ID | Varchar | 15 |
| MIN_MEMBERS | Number | 22 |

TABLE 1-continued

Sharing Group Definition

| Name | Physical Type | Length |
| --- | --- | --- |
| MODIFICATION_NUM | Number | 22 |
| NAME | Varchar | 50 |
| OWNER_PROD_ID | Varchar | 15 |
| ROW_ID | Varchar | 15 |
| RTM_PROD_ID | Varchar | 15 |
| TYPE | Varchar | 30 |

TABLE 2

Member/Owner Relationships

| Name | Physical Type | Length |
| --- | --- | --- |
| CHANNEL | Varchar | 50 |
| CONFLICT_ID | Varchar | 15 |
| CREATED | UTC Date Time | 7 |
| CREATED_BY | Varchar | 15 |
| DB_LAST_UPD | UTC Date Time | 7 |
| DB_SRC_UPD_SRC | Varchar | 50 |
| DSG_ID | Varchar | 15 |
| EFF_DATE | UTC Date Time | 7 |
| END_DATE | UTC Date Time | 7 |
| INTEGRATION_ID | Varchar | 15 |
| LAST_UPD | UTC Date Time | 7 |
| LAST_UPD_BY | Varchar | 15 |
| MEMBER_ASSET_ID | Varchar | 15 |
| MODIFICATION_NUM | Number | 22 |
| OWNER_ASSET_ID | Varchar | 15 |
| ROW_ID | Varchar | 15 |
| SMS_NOTIFY | Varchar | 1 |
| STATUS_CD | Varchar | 30 |

TABLE 3

Sharing Group Transactions

| Name | Physcial Type | Length |
| --- | --- | --- |
| ACTION_CD | Varchar | 30 |
| CHANNEL | Varchar | 50 |
| COMMENT | Varchar | 255 |
| COMPLETED_DT | UTC Date Time | 7 |
| CONFLICT_ID | Varchar | 15 |
| CREATED | UTC Date Time | 7 |
| CREATED_BY | Varchar | 15 |
| DB_LAST_UPD | UTC Date Time | 7 |
| DB_SRC_UPD_SRC | Varchar | 50 |
| DSG_ID | Varchar | 15 |
| EFF_DT | UTC Date Time | 7 |
| END_DT | UTC Date Time | 7 |
| INTEGRATION_ID | Varchar | 15 |
| LAST_UPD | UTC Date Time | 7 |
| LAST_UPD_BY | Varchar | 15 |
| MEMBER_ASSET_ID | Varchar | 15 |
| MODIFICATION_NUM | Number | 22 |
| OWNER_ASSET_ID | Varchar | 15 |
| REQ_DUE_DT | UTC Date Time | 7 |
| ROW_ID | Varchar | 15 |
| STATUS_CD | Varchar | 30 |
| SMS_NOTIFY | Varchar | 1 |
| SUBMITTED_DT | UTC Date Time | 7 |
| TXN_ORIGIN | Varchar | 30 |

FIG. 4 is a screenshot of a pop-up user interface component 710 that is generated and displayed by CRM module 10 when the customer service representative selects the Total Internet entry in the My Groups column of the particular subscriber's Total Internet listing in user interface component 700. User interface component 710 displays listings 712 making up the membership of the Total Internet sharing group. Each listing displays the name of the sharing group, the sharing group ID, the owner service ID, the member service MDN, the effective date of the membership, the end date at of the membership (if any), the status, the channel, and an SMS notify checkbox.

The listings 712 in user interface component 710 are generated by CRM module 10 by selecting from the Members/Owners Relationships table those records having contents in an OWNER_ASSET_ID field that match the asset ID of the subscriber who owns the Total Internet sharing group associated with the subscriber's Total Internet service. As shown in user interface component 710, in this example the current membership of the Total Internet sharing group for the subscriber consists of one member.

As shown in FIG. 4, it can be seen that CRM module 10 has also generated a selectable "Add Member" button 714 and a selectable "Remove Member" button 716 both at the top right of user interface component 710. The customer service representative may select either of these selectable buttons 714, 716 in order to cause CRM module 10 to present a user interface component for receiving an instruction to modify the current membership of the sharing group.

Figure 5A:
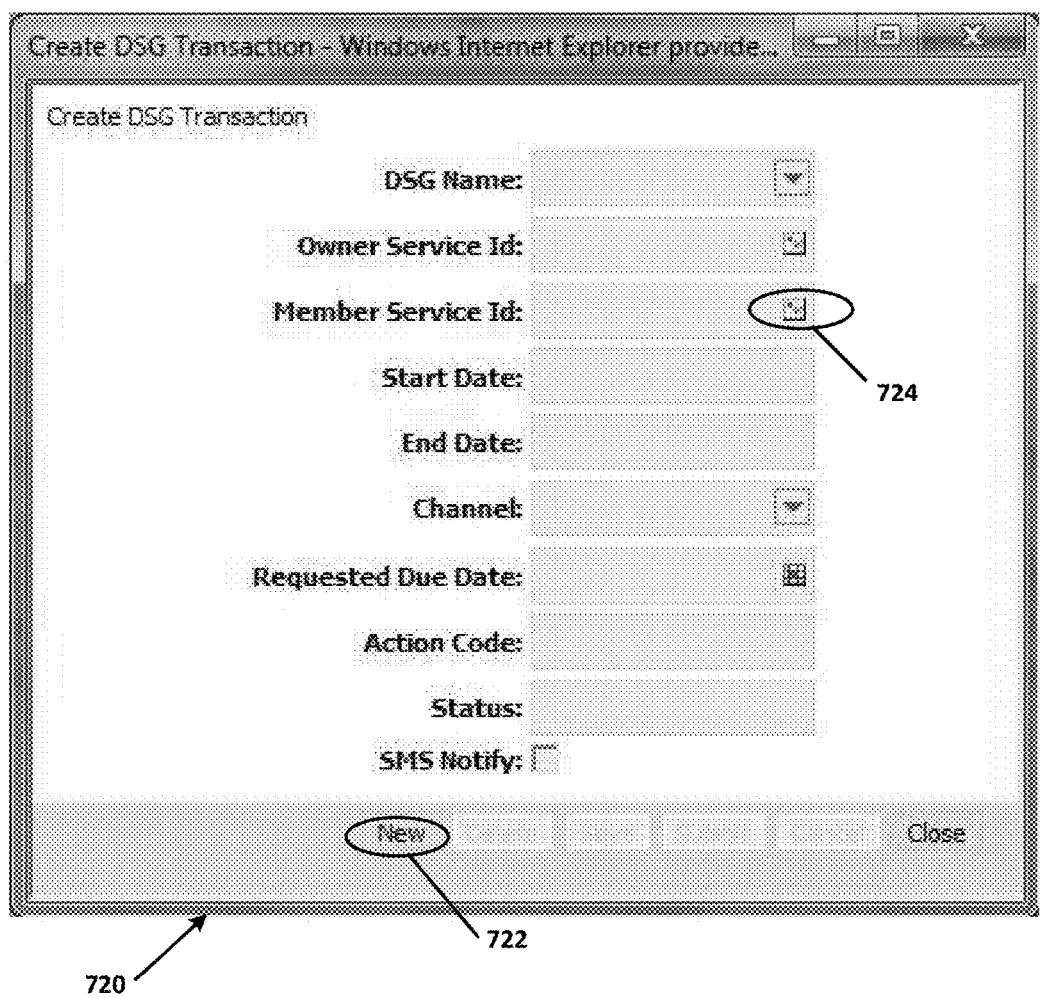

In this embodiment, in response to a selection by a customer service representative of the "Add Member" button 714, CRM module 10 generates and displays a pop-up user interface component 720, as shown in FIG. 5a.

User interface component 720 includes a form having fillable fields for enabling the customer service representative to specify a new pending transaction that, once generated, will be inserted by CRM module 10 into the Sharing Group Transactions table in the CRM database. It can be seen that CRM module 10 has generated a selectable "New" button 722 at the bottom of user interface component 720. The customer service representative may select this "New" button 722 in order to start the process of specifying the new "Add" transaction.

Figure 5B:
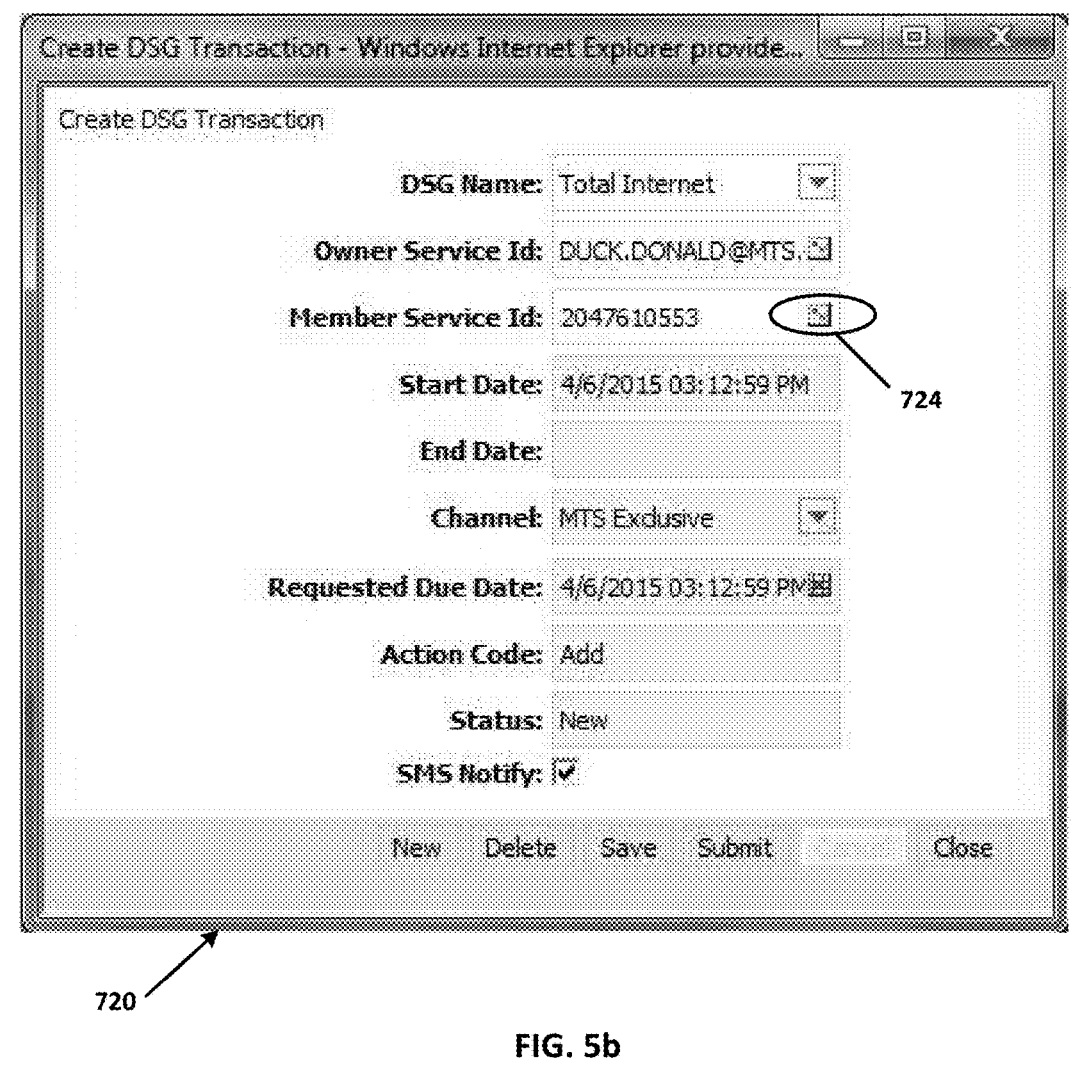

As shown in FIG. 5b, upon selecting the "New" button 722, CRM module 10 automatically populates certain fillable fields in the form of user interface component 720 based on the current state of CRM module 10 for the customer service representative. More particularly, since the customer service representative has navigated to user interface component 720 via the Total Internet asset for an owner subscriber, CRM Module 10 can automatically populated the owner and other fields. In this embodiment, the following fields are automatically populated: DSG Name ("Total Internet"), the Owner Service ID field (the service ID of the owner of the Total Internet sharing group), the Start Date field (Current Date/Time), the Channel ("MTS Exclusive"), the Requested Due Date field (Current Date/Time), the Action Code ("Add"), the Status ("New") and SMS Notify (checked).

Figure 6A:
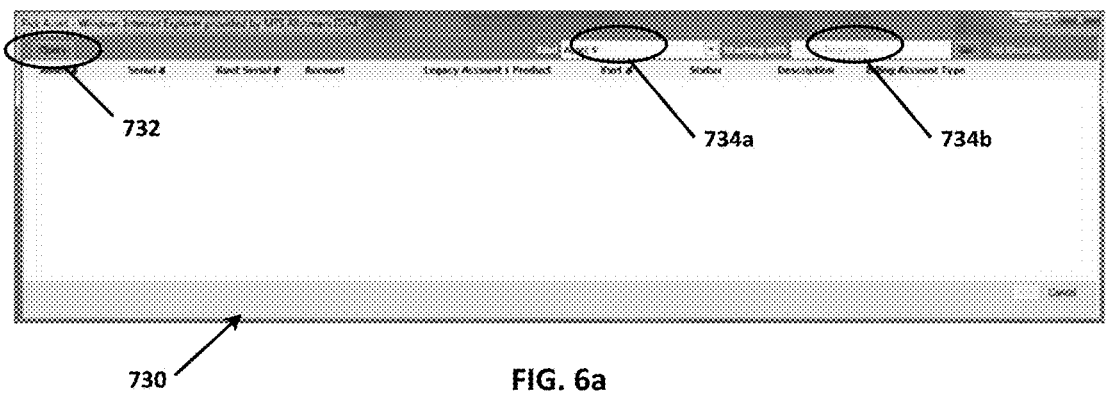
Figure 6B:
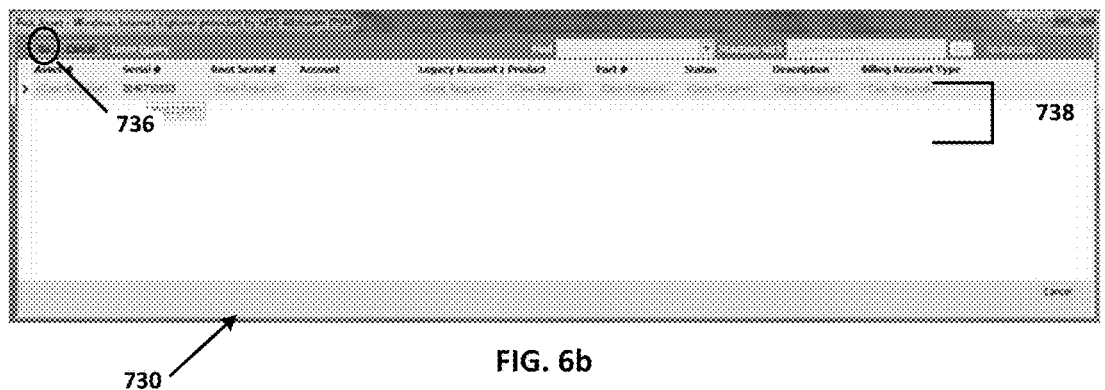
Figure 6C:
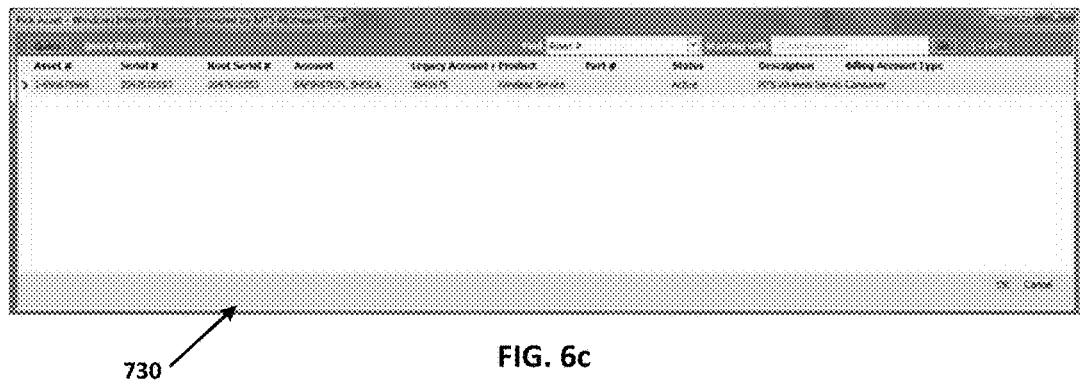

With certain of the fields in the fillable form having been automatically populated by CRM module 10, the customer service representative can select the Member Service ID field and enter an MDN manually according to instructions from the subscriber to do so. However, the customer service representative may alternatively select a selector 724 associated with the Member Service ID field in order to cause CRM Module 10 to generate and display a Pick Asset user interface component 730, as shown in FIGS. 6a through 6c. User interface component 730 provides the customer service representative with the ability to search for and select a particular subscriber thereby to populate the Member Service ID field to further specify the Add transaction.

A Query selectable button 732 in user interface component 730, when selected, causes CRM Module 10 to select and display portions of subscriber records in a subscriber table in the CRM database having an asset ID entered into the Member Service ID field in this example, "2047610553"). In the event that the selector 724 in user interface component 720 is selected without the customer service representative having entered anything into the Member Service ID field, then the customer service representative will be required to enter something into the text box 734b of user interface component 730 in order for a selection of the Query selectable button 732 to trigger a database selection by CRM module 10 of matching subscriber records. Dropdown 734a of user interface component 730 defaults to Asset # such that a query will select assets in the CRM database whose Asset number matches what is present in text box 734b. However, other options are provided to enable customer service representative to search, not by asset #, but some other criteria such as subscriber name.

With the Query selectable button 732 having been selected, CRM module 10 selects from the CRM database those records that match the query itself. A listing 738 of matches are presented in user interface component 730 and the customer service representative can select a desired one of the listings, resulting in the listing being highlighted. The customer service can then press a Go selectable button 736 in order to close user interface component 730 and cause CRM module 10 to insert the MDN of the highlighted listing into the Member Service ID field of user interface component 720, as shown in FIG. 7.

With the transaction having been specified by both automatic population of fields by CRM module 10 and the entering or selection by a customer service representative of the appropriate Member Service ID, the customer service representative can select the Submit selectable button that has been generated by CRM module 10 and displayed at the bottom of user interface component 720 in order to insert the transaction into the Sharing Group Transaction table.

Figure 8:
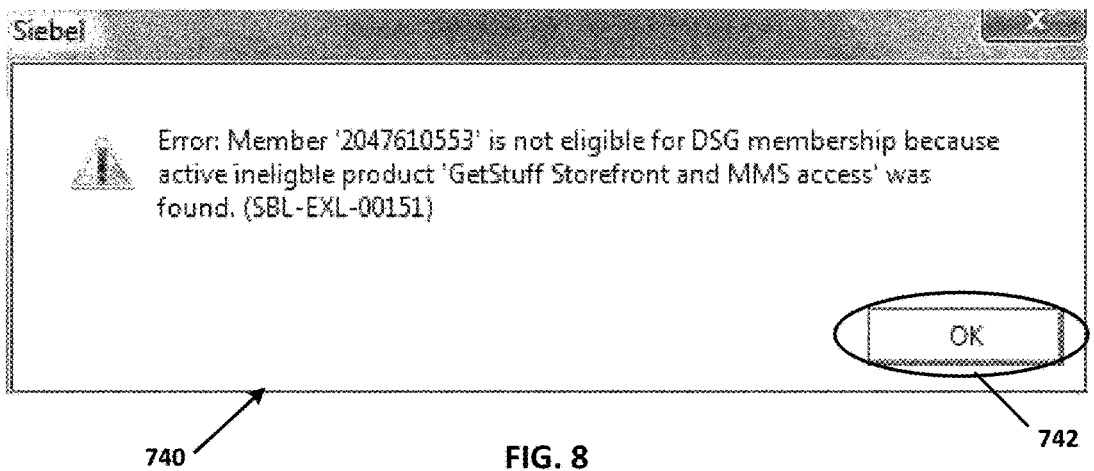

Prior to the transaction being inserted into the Sharing Group Transactions however, CRM module 10 conducts a confirmation that the subscriber identified by the Member Service ID is eligible to be a member in the identified Total Internet sharing group. CRM module 10 reviews records in the CRM database that are associated with the subscriber identified by the Member Service ID to determine whether there is some problem or conflict with that member joining the membership of the sharing group. This may happen if the records or business logic indicate that the subscription of the member includes a discount or service that is not combinable with a discount sharing group membership. In the event that there is a problem, CRM module 10 generates and displays a user interface component 740 explaining the problem so that the customer service representative can explain the problem to the subscriber that is requesting the membership maintenance, as shown in FIG. 8. The customer service representative can select a selectable OKAY button 742 to clear the user interface component 740 from the customer service representative's display device.

In the event that there is no problem detected by CRM module 10, CRM module 10 inserts the transaction as a record into the Sharing Group Transactions table in the CRM database. In this embodiment, referring to Table 3, the field values of the inserted record correspond to the values in the fillable form of user interface component 720, namely having an ACTION_CD value corresponding to the Action Code, a CHANNEL value corresponding to the Channel, a CREATED value corresponding the Requested Due Date, a DSG_ID corresponding to the Total Internet sharing group identifier specified in the Member/Owner Relationships table in a record associated with the particular subscriber's OWNER_ASSET_ID, an EFF_DT corresponding to the Start Date, an END_DT corresponding to the End Date, a MEMBER_ASSET_ID corresponding to the Member Service Id, an OWNER_ASSET_ID corresponding to the Owner Service Id, a STATUS_CD of "Pending", an SMS_Notify corresponding to the checked/unchecked value of SMS Notify, a SUBMITTED_DT corresponding to the Requested Due Date, and a TXN_Origin value that is left blank.

Figure 9:
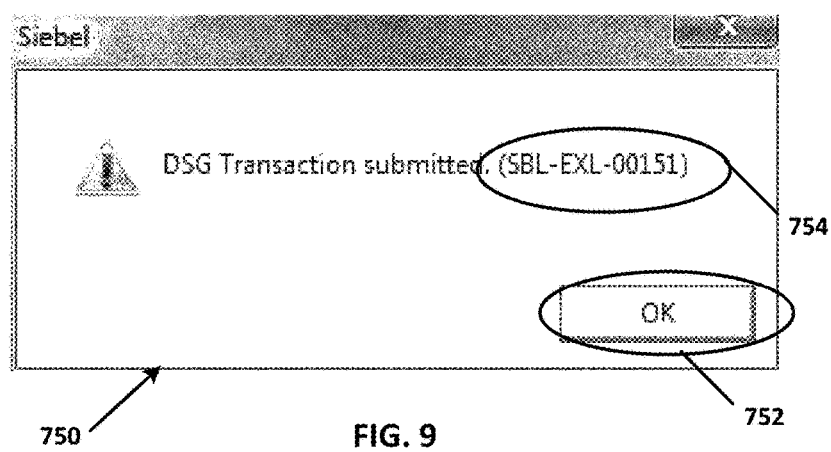

Pursuant to the transaction record having been inserted into the Sharing Group Transactions table, a user interface component 751 is generated by CRM module 10 and displayed to the customer service representative confirming that the transaction was submitted and identifying the transaction identifier 754, as shown in FIG. 9. The customer service representative can select an OKAY button 752 to clear the user interface component 750 from the customer service representative's display device.

Figure 10:
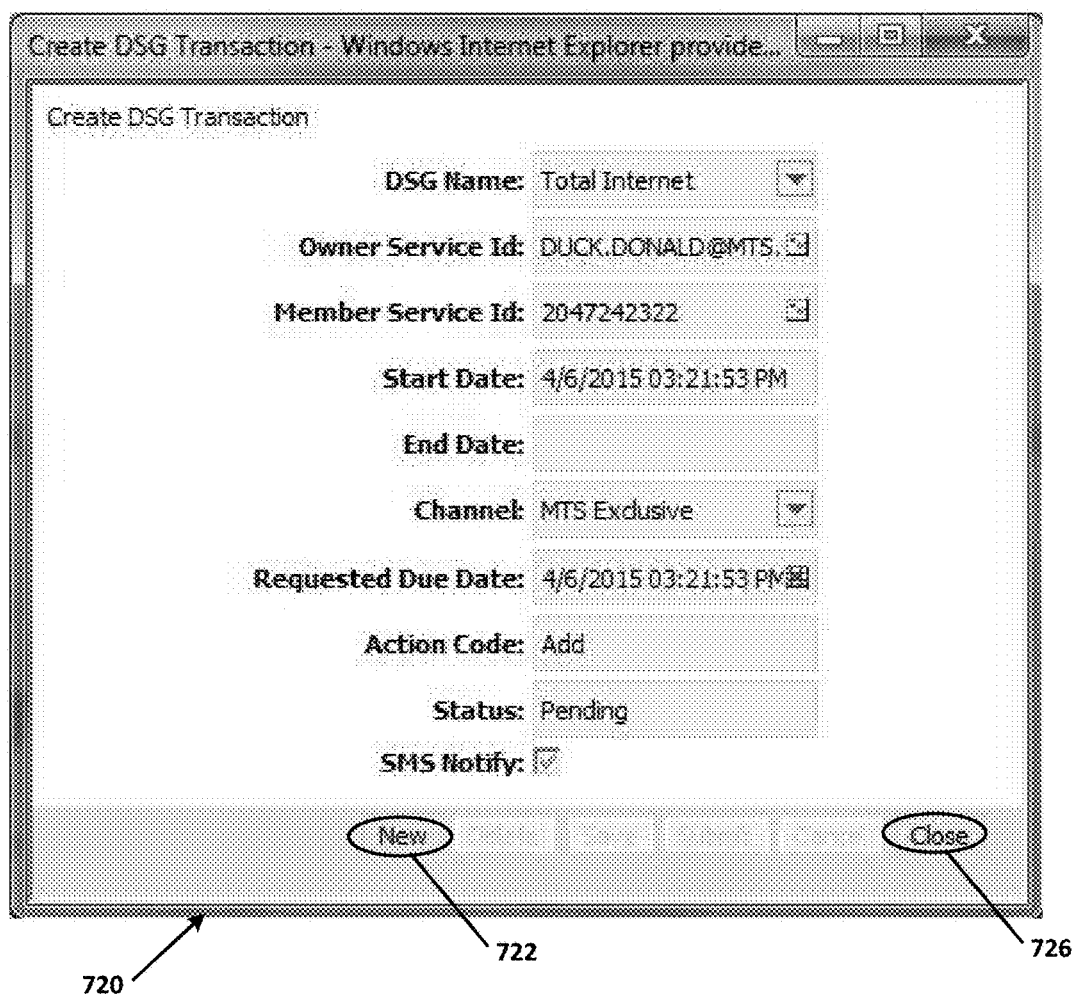

Upon selecting the OKAY button 752, the customer service representative is returned to user interface component 720 as shown in FIG. 10, and can note that the form's fields are no longer editable and that the transaction Status is indicated as Pending. The customer service representative may select the selectable New button 722 to begin to specify a new transaction for the sharing group, or can press a selectable Close button 726 in order to clear user interface component 720 from the customer service representative's display device.

Figure 11:
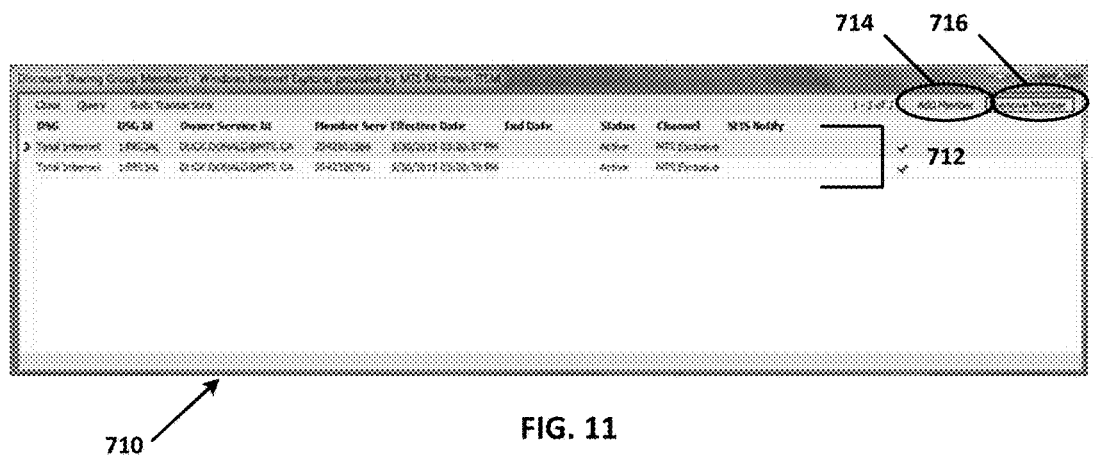

Furthermore, after user interface component 720 has been cleared, user interface component 710 is displayed again showing the membership listing of the Total Internet sharing group for the particular subscriber, as shown in FIG. 11.

Figure 12:
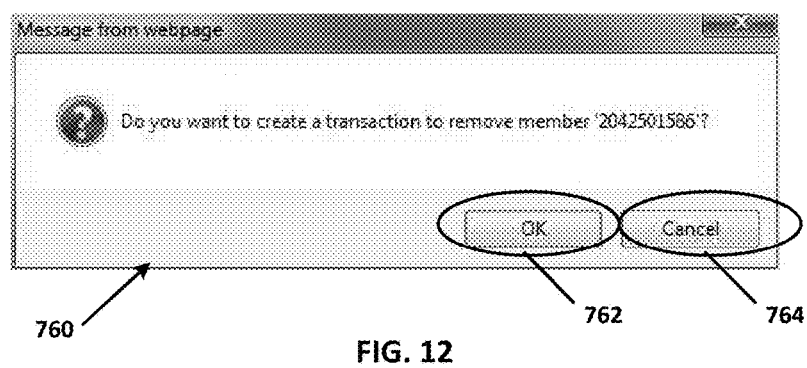

The process of modifying membership in the sharing group to remove a member is similar to, but simpler for the customer service representative than, the above-described process of adding a member. In this embodiment, as shown in FIG. 11, in response to a selection of a particular entry in the listing membership listing of the Total Internet sharing group for the particular subscriber via user interface component 710, the "Remove Member" button 714 may be selected by the customer service representative. In response, CRM module 10 generates and displays a pop-up user interface component 760, as shown in FIG. 12. User interface component 760 presents a confirmation request for the customer service representative specifying the MDN of the member that, upon confirmation, would be removed from the membership of the Total Internet sharing group. Since the member's MDN is specified because the customer service representative has selected the member specifically from the membership list, the customer service representative does not have to go through a process of further specifying the parameters of a remove member transaction. As such, should the customer service representative select the OKAY button 762, CRM module 10 generates and inserts into the Sharing Group Transactions table with a status of Pending a transaction with an Action Code field value of "Remove" and the other fields having similar values to those indicated above in the description about specifying the "Add" transaction. In particular, in this embodiment, referring to Table 3, the field values of the inserted record having an ACTION_CD value of "Remove", a CHANNEL value "MTS Exclusive", a CREATED value having the current date/time, a DSG_ID corresponding to the Total Internet sharing group identifier specified in the Member/Owner Relationships table in a record associated with the particular subscriber's OWNER_ASSET_ID, a MEMBER_ASSET_ID corresponding to the MDN to be removed, an OWNER_ASSET_ID corresponding to the particular subscriber's service Id, a STATUS_CD of "Pending", a SUBMITTED_DT corresponding to the current date/time, and a TXN_Origin value that is left blank.

If the customer service representative selects the CANCEL button 764 then a transaction is not inserted into the Sharing Group Transactions table, user interface component 760 is removed from display on the customer service representative's display device and user interface component 710 is displayed again.

After one or more transactions have been inserted into the Sharing Group Transactions table in response to requests of the customer service representative by a particular subscriber, the customer service session may be completed with the assurance by the customer service representative to the subscriber that the modifications to the membership of the sharing group have been set in motion.

As described above, CRM Module 10 generates and inserts pending modification transactions for the Total Internet sharing group as records in the Sharing Group Transactions table in response to instructions received via the user interface component generated by CRM Module 10 (steps 200 and 300). In addition, CRM Module 10 executes a separate process that, in this embodiment, automatically runs periodically (every 15 minutes, for example) to construct payloads, each payload based on all transactions in the Sharing Group Transactions table with a status of Pending or Retry that are associated with a given sharing group (that is, that have the same DSG_ID and a status of "Pending" or "Retry" as will be described) (step 400).

In this embodiment, when CRM module 10 runs the payload-constructing process it generates a payload that incorporates the DSG_ID and an array having MEMBER_ASSET_IDs each associated with a respective "ADD" or "DELETE" action. CRM module 10 will not incorporate into the payload data from transaction records that do not have a STATUS_CD value "Pending", except for those that have a status of "Retry", as will be described in further detail below. Much or all of the information in the Sharing Group Transactions table pertaining to a particular Sharing Group will be incorporated into the payload in this manner.

With the payload having been constructed, CRM module 10 generates a message that incorporates the payload, and inserts the message into a middleware messaging queue (step 500). In this embodiment the middleware messaging queue is a component of middleware module 20, which in this embodiment is an AIA (application integration architecture) advance queue in the middleware database named MTS_DSGRREQ_JMSQ.

In this embodiment, the message incorporating the payload is also provided to an order and service management (OSM) module, which is integrated with and instructs external components such as a retail and trade management (RTM) module for provisioning assets for the user(s) being added as well as de-provisioning assets for the user(s) being removed, and a unified inventory management (UIM) module for ensuring that a tethering service is available to user(s) being added and is withdrawn from user(s) being removed.

Middleware module 20 processes the inserted message and may distribute instructions to several other subsystems thereby to synchronize the requested sharing group membership with the subsystems. In this embodiment, one of the subsystems is billing module 30. It is in the billing database of billing module 30 that the Total Internet sharing group is created and associated with the particular subscriber and the Total Internet service. This creation would have been done by way of a separate process at the time the particular subscriber made his or her initial order to purchase the Total Internet sharable service. The mechanisms by which sharing groups are created are considered outside of the scope of this description.

Middleware module 20 instructs billing module 30 to modify associations in the billing database in accordance with the payload (step 600) thereby to associate or dissociate members with or from the sharing group record(s) in the billing database. This is done by middleware module 20 involving a customized wrapper that is made available by the billion module 30 thereby to make an order to billing module 30. The customized wrapper, in this embodiment, is named MTS_OP_CUST_SHARING_GROUP_MODIFY, and is passed a number of parameters by middleware module 20, including an array with a list of the members to be added or removed, a middleware order number, and the or many of the parameters in the payload in accordance with an input specification as shown in FIG. 13a. For example, the array with the list of members and actions is identified as PIN_FLD_MEMBERS, with the PIN_FLD_ACTION_NAME set to "ADD" or "REMOVE". It will be noted that OWNER_ASSET_ID is the unique identifier for the service that owns the DSG. The DSG_ID is the unique identifier for discount sharing group product purchased under the Billing Account.

When middleware module 20 calls MTS_OP_CUST_SHARING_GROUP_MODIFY with the relevant parameters, billing module 30 executes updates in the billing database in order to add the members in the PIN_FLD_MEMBERS array as members of the Total Internet sharing group owned by the PIN_FLD_SERVICE_OBJ user in the billing database.

In this embodiment, the price paid by the sharing group owner for the Total Internet service will depend on the number of members in the Total Internet sharing group. As such, billing module 30 is configured to automatically determine whether a call from middleware module 20 will cause in a net change in the number of members in the sharing group. For example, where the particular subscriber wishes only to add one or more members, the billing module 30 will determine that there will be a net change in number of members. As such, after executing updates to records in the billing database, billing module 30 also stops and then restarts the Total Internet service. This is done in order to enable the billing module 30 to track and report on pricing for the sharable Total Internet service before the requested change, and to track and report on different pricing for the sharable Total Internet service after the requested change. The billing module 30 is thereby able to provide a particular subscriber—the owner of the sharable Total Internet service—with accurate pricing for service received before the change and for service received after the change, on a pro-rated basis. Further details of generating subscriber bills and the like are beyond the scope of this document and will thus not be described further herein.

Upon completion of the updates to the billing database and, if required, after stopping and restarting the sharable service, billing module 30 constructs and returns to middleware module 20 an output specification including a results array. The results array lists each member that was requested to be added and that member's respective success of failure in being added in the billing database. In this embodiment, the output specification returned by billing module 30 contains data as set out in FIG. 13b.

Figure 14:
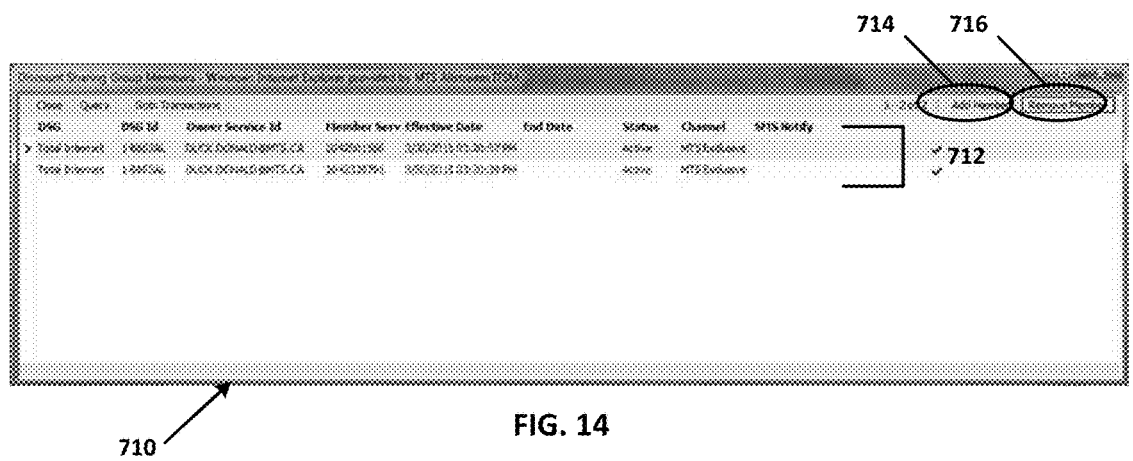
FIG. 14 through 25 are user interface components generated and displayed by the system, according to an embodiment.

Middleware module 20, upon receiving the output specification, will return a "Billing Success" message to CRM module 10 for each member that has been successfully added, CRM module 10, in turn, updates the corresponding transaction in the Sharing Group Transactions table in the CRM database from "Pending" to "Complete", and then inserts a record into the Member/Owner Relationships table in the CRM database associating the added member with the sharing group therein. As a result, a customer service representative requesting to view user interface component 710 will see the updated list of members of the sharing group, including the recently-added member, as shown in FIG. 14.

Middleware module 20, upon receiving the output, specification from billing module 30, will return a "Billing Failure" message to CRM module 10 for each member that has not been able to be added for some reasons. Such reason may be a technical problem or one of logic, such that some condition codified by the records of the billing database may be incompatible with a particular subscriber joining the membership of the sharing group. CRM module 10, in turn, updates the corresponding transaction in the Sharing Group Transactions table in the CRM data from "Pending" to "Retry", so that it may be incorporated into a payload at a later time for another attempt.

In the example described above, the customer service representative was able to select a sharing group entry 702 in the My Groups column for a sharing group owner in order to cause CRM Module 10 to generate user interface component 710 for displaying current membership for the related sharing group. The customer service representative was then able to request a modification to the membership of that sharing group.

Figure 15:
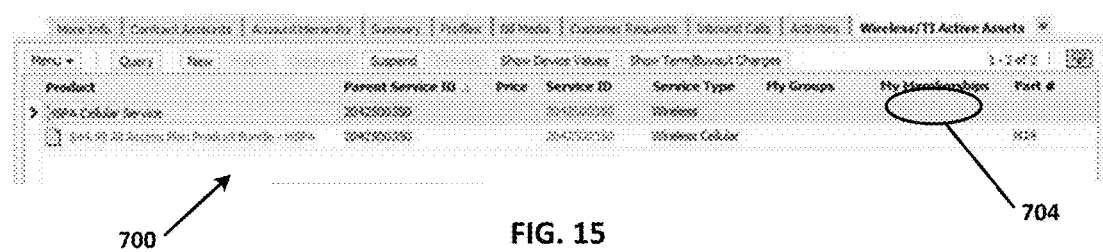

In this embodiment, the customer service representative may choose to navigate through requesting a modification to the membership of a sharing group via a view that displays a potential sharing group member's assets, rather than via a view that displays the sharing group owner's sharing group(s). In particular, with reference to FIG. 15, asset view 700 for a subscriber also includes a My Memberships column in which CRM module 10 displays a sharing group entry in the My Memberships column for a particular subscriber asset that is part of a sharing group. In this example, the wireless asset of the subscriber in the user interface component of FIG. 15 shows nothing in the column, indicating that the wireless asset of this subscriber is not a member of a sharing group. However, the customer service representative is able to select a selectable blank area 704 in the My Memberships column for the wireless asset in order to cause CRM module 10 to generate a pop-up user interface component 710a, as shown in FIG. 16.

User interface component 710a is similar to user interface component 710 except that, rather than displaying a listing of members in a particular sharing group, user interface component 710a displays a listing of sharing groups of which the subscriber's wireless asset is a member. Each listing, if there are any listings, displays the sharing group name, the sharing group ID, the owner service ID, the member service, the effective date, the end date, the status, the channel and an SMS notify checkbox.

The listings 712A in user interface component 710A are generated by CRM module 10 by selecting from the Members/Owners Relationships table those records having contents in a MEMBER_ASSET_ID field that match the asset ID of the subscriber's particular wireless asset. As can be seen in FIG. 16, in this example there are no listings 712A, which is an indication that this particular subscriber's wireless asset is not listed in the Member/Owner Relationship table since it is not yet a member of any sharing groups.

Figure 16:
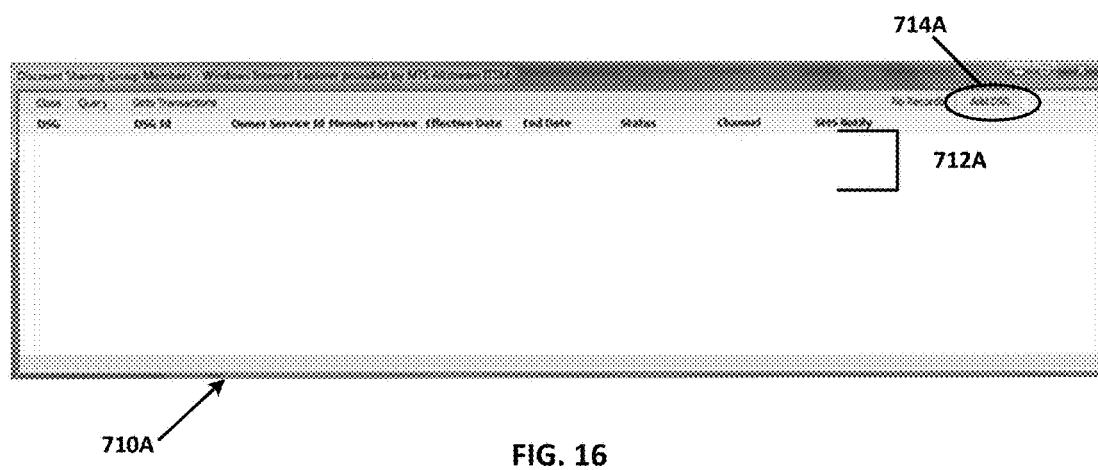

As shown in FIG. 16, it can be seen that CRM module 10 has generated a selectable "Add DSG" button 714A at the top right of user interface component 710A. The customer service representative may select this selectable button 714A in order to enable CRM module 10 to present a user interface component for receiving an instruction to modify the current membership of a sharing group, namely in this case to add the wireless asset of the current subscriber.

Figure 17A:
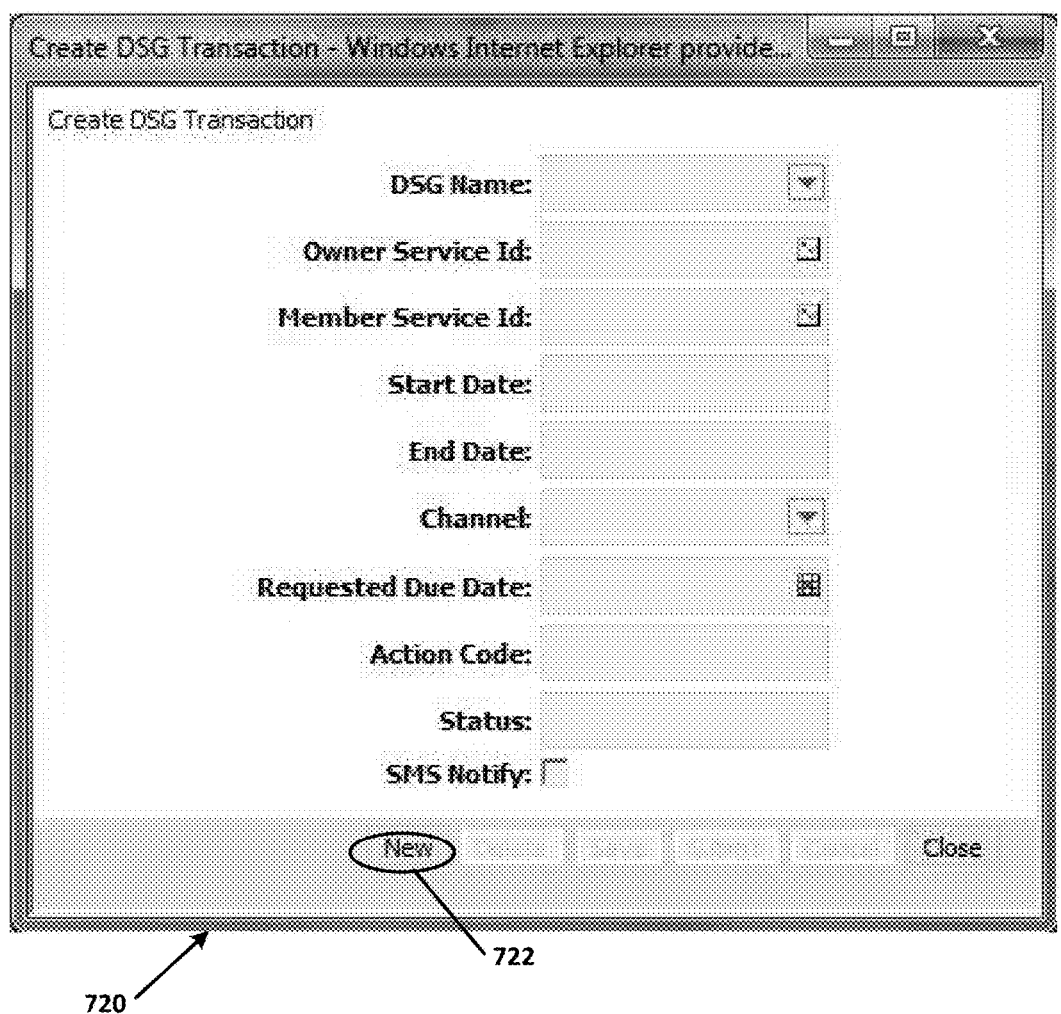

In this embodiment, in response to a selection of the "Add DSG" button 714A, CRM module 10 generates and displays pop-up user interface component 720, as shown in FIG. 17a.

User interface component 720 displays the form having fillable fields for enabling the customer service representative to specify a new pending transaction that, once generated, will be inserted by CRM module 10 into its Sharing Group Transactions table. It can be seen that CRM module 10 has generated the selectable "New" button 722 at the bottom of user interface component 720. The customer service representative may select this "New" 722 button in order to start the process of specifying are "Add" transaction.

Figure 17B:
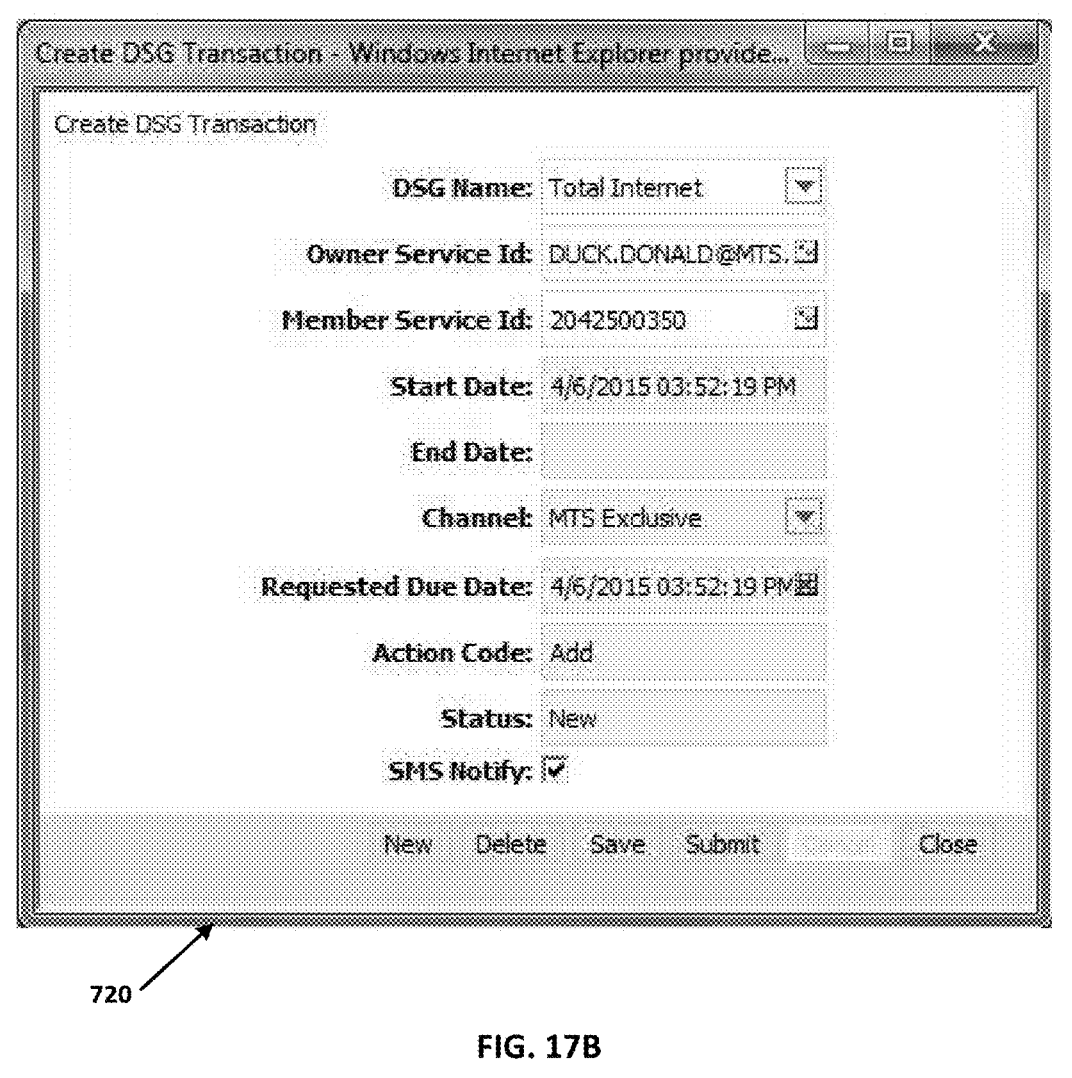

As shown in FIG. 17b, upon selecting the "New" button 722, CRM module 10 automatically populates certain fields in the fillable form of user interface component 720 based on the current state of CRM module 10 for the customer service representative. That is, as the customer service representative has navigated to user interface component 720 via the wireless asset for a potential member subscriber, CRM Module 10 can automatically populate the member and some other fields. In this embodiment, the following fields are also automatically populated: DSG Name ("Total Internet"), the Start Date field (Current Date/Time), the Channel ("MTS Exclusive"), the Requested Due Date field (Current Date/Time), the Action Code ("Add"), the Status ("New") and SMS Notify (checked). What is not automatically populated is the Owner Service ID for the owner of the particular sharing group, in this embodiment the Total Internet sharing group, that the potential member subscriber's wireless asset is to be added to.

Figure 17C:
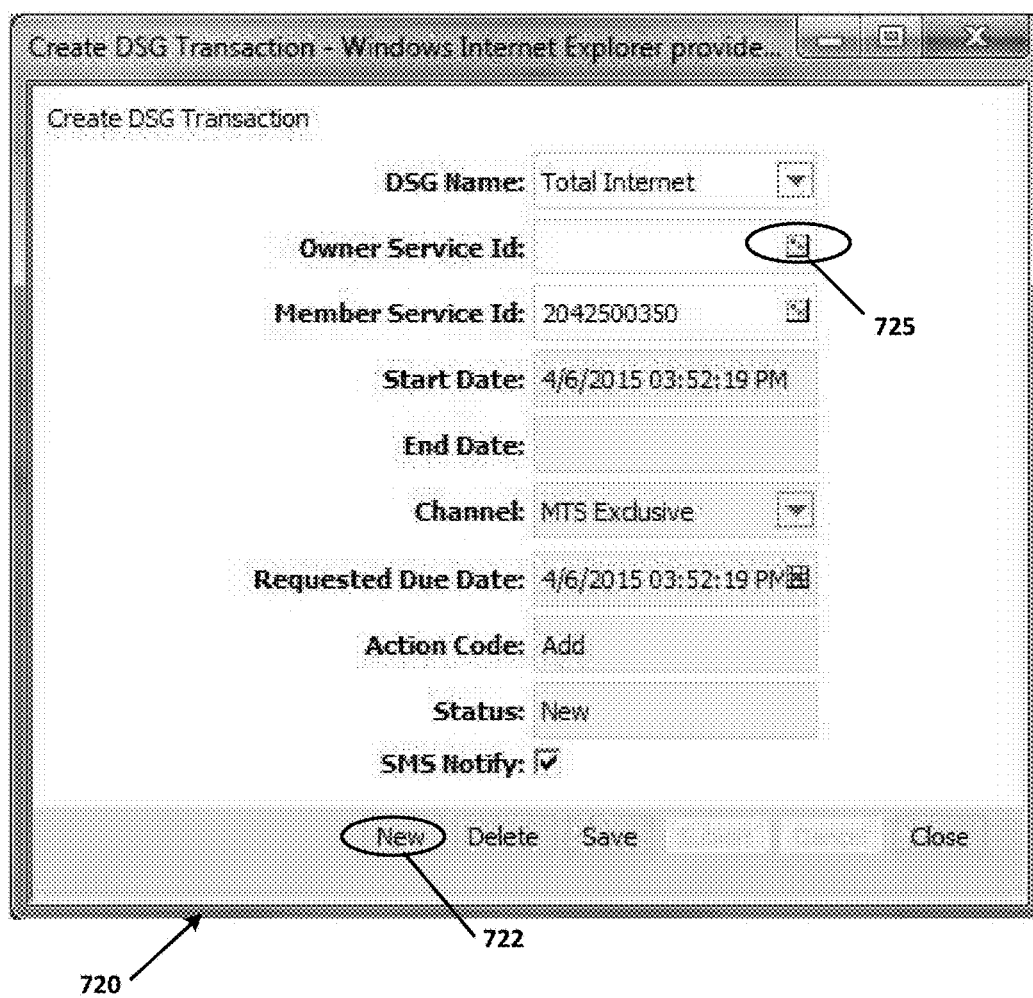
Figure 18A:
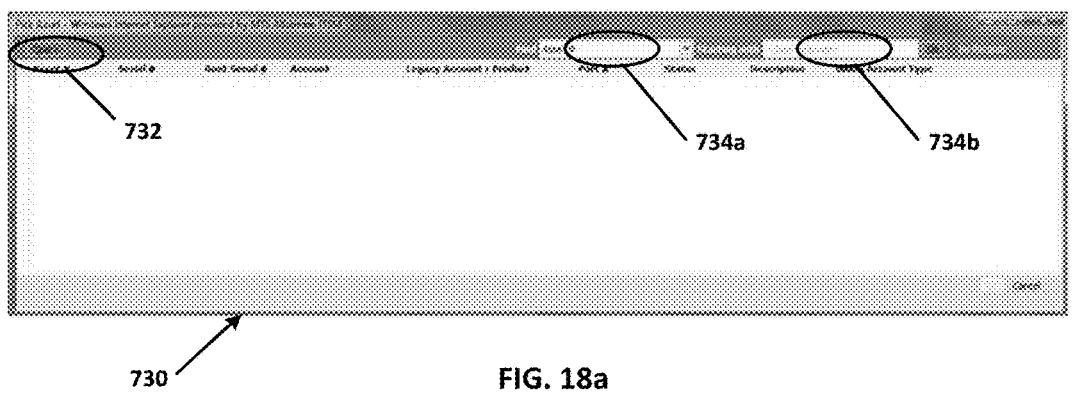
Figure 18B:
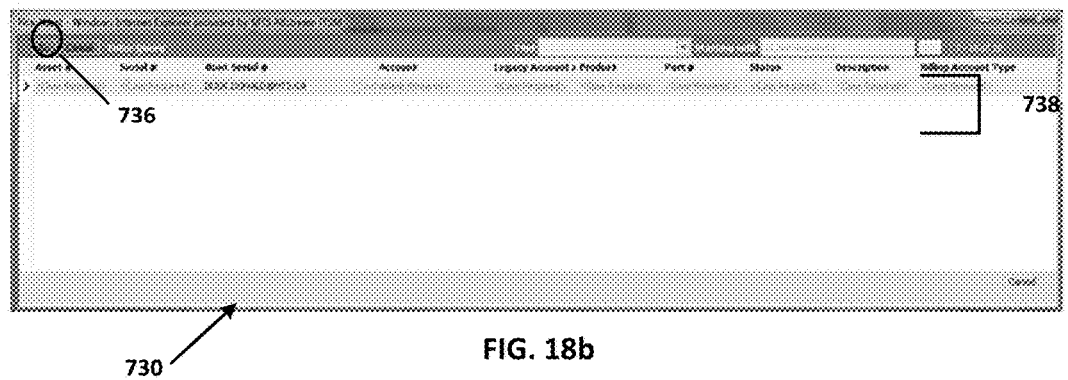

With certain of the fields in the fillable form having been automatically populated by CRM module 10, the customer service representative can select the Owner Service ID field and enter a value manually. However, the customer service representative may alternatively select a selector 725 associated with the Owner Service ID field as shown in FIG. 17c in order to cause CRM Module 10 to open the Pick Asset user interface component 730, as shown in FIGS. 18a and 18b, User interface component 730 provides the customer service representative with the ability to search for and select a particular subscriber thereby to populate the Owner Service ID field to further specify the Add transaction.

The Query selectable button 732 in user interface component 730, when selected, causes CRM Module 10 to select and display portions of subscriber records in a subscriber table of the CRM database having an asset ID that starts with the Owner Service ID entered into the Owner Service ID field (in this example, "DUCK.DONALD@MTS.CA"). In the event that the selector 725 in user interface component 720 is selected without the customer service representative having entered anything into the Owner Service ID field, then the customer service representative will be required to enter something into the text box 734b of user interface component 730 in order for a selection of the Query selectable button 732 to trigger a selection by CRM module 10 of matching subscriber records. Dropdown 734a of user interface component 730 defaults to Asset # such that a query will select assets in the CRM database whose Asset number matches what is present in text box 734*b*. However, other options are provided to enable the customer service representative to search, not by asset #, but by other criteria such as subscriber name.

Figure 19:
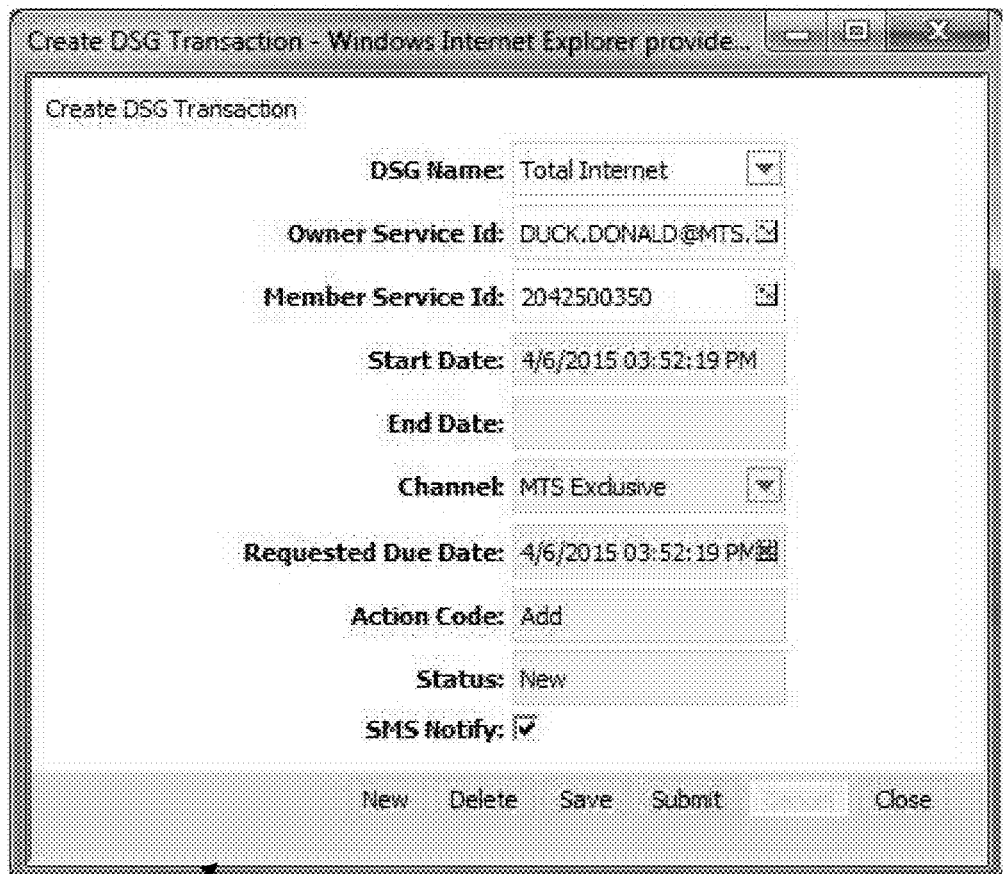

With the Query selectable button 732 having been selected, CRM module 10 selects from the CRM database those records that match the query itself. A listing 738 of matches are presented in user interface component 730 and the customer service representative can select a desired one of the listings, resulting in the listing being highlighted. The customer service representative can then press the Go selectable button 736 in order to close user interface component 730 and insert the asset ID of the highlighted listing into the Owner Service ID field of user interface component 720, as shown in FIG. 19.

With the transaction having been specified by both automatic population of fields by CRM module 10 and the entering or selection by a customer service representative of the appropriate Owner Service ID, the customer service representative can select the Submit selectable button that has been generated by CRM module 10 and displayed at the bottom of user interface component 720 in order to insert the transaction in the Sharing Groups Transactions table.

Figure 20:
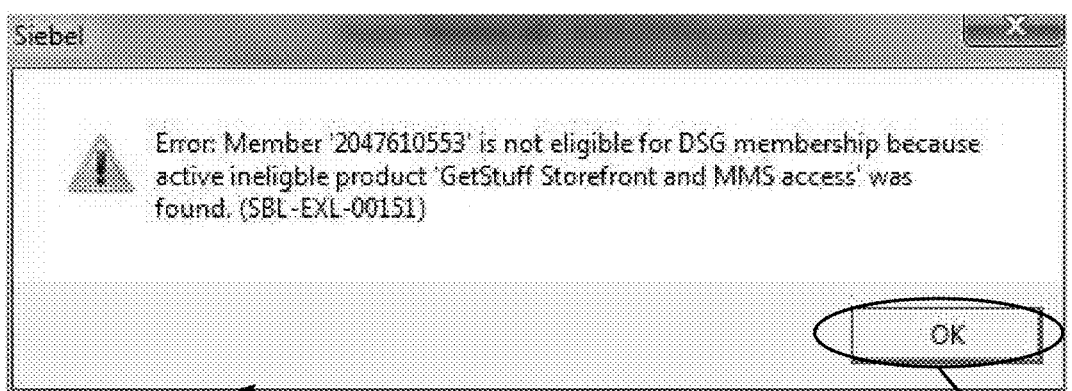

Prior to the transaction being inserted into the Sharing Transactions table, however, CRM module 10 conducts a confirmation that the subscriber identified by the Member Service ID is eligible to be a member in the identified Total Internet sharing group. CRM module 10 reviews the records in the CRM database that are associated with the subscriber identified by the Member Service ID to determine whether there is some problem or conflict with the member joining the sharing group. In the event that there is a problem, CRM module 10 generates and displays user interface component 740 explaining the problem so that the customer service representative can explain the problem to the subscriber that is requesting the membership maintenance, as shown in FIG. 20. The customer service representative can select an OKAY selectable button 742 to clear the user interface component 740 from the customer service representative's display device.

In the event that there is no problem detected by CRM module 10, CRM module 10 inserts the transaction as a record into the Sharing Group Transactions table in the CRM database. In this embodiment, referring to Table 3, the field values of the inserted record correspond to the values in the fillable form of user interface component 720, namely having ACTION_CD value corresponding to the Action Code, a CHANNEL value corresponding to the Channel, a CREATED value corresponding the Requested Due Date, a DSG_ID corresponding to the Total Internet sharing group identifier specified in the Member/Owner Relationships table in a record associated with the particular owner's OWNER_ASSET_ID, an EFF_DT corresponding to the Start Date, an END_DT corresponding to the End Date, a MEMBER_ASSET_ID corresponding to the Member Service Id, an OWNER_ASSET_ID corresponding to the Owner Service Id, a STATUS_CD of "Pending", an SMS_Notify corresponding to the checked/unchecked value of SMS Notify, a SUBMITTED_DT corresponding to the Requested Due Date, and a TXN_Origin value that is left blank.

Figure 21:
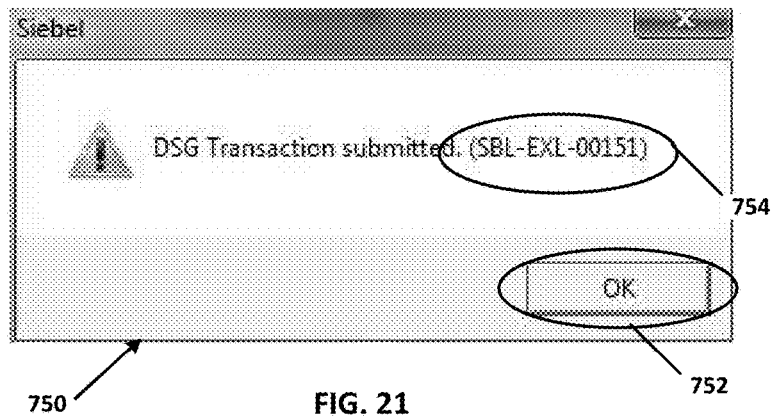

Pursuant to the transaction record having been inserted into the Sharing Group Transactions table, user interface component 750 is generated by CRM module 10 and displayed to the customer service representative confirming that the transaction was submitted and identifying the transaction identifier 754, as shown in FIG. 21. The customer service representative can select an OKAY button 752 to clear the user interface component 750 from the customer service representative's display device.

Figure 22:
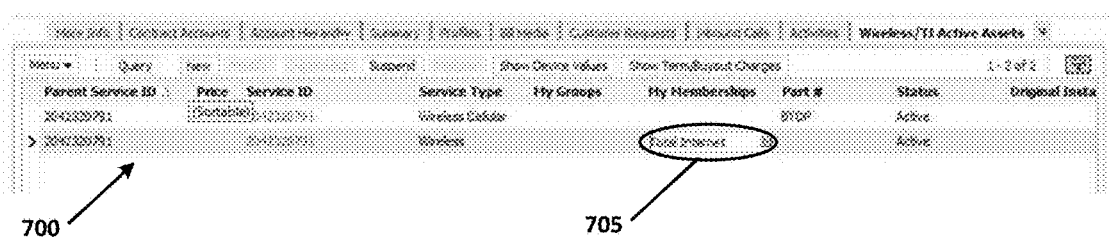

After user interface component 750 has been cleared, user interface component 700 is displayed again showing the asset view for the member that was just added to the sharing group, as shown in FIG. 22. It can be seen in FIG. 22 that with the wireless asset having been added to the Total Internet sharing group the My Memberships column is no longer blank, instead displaying "Total Internet" 705.

Figure 23:
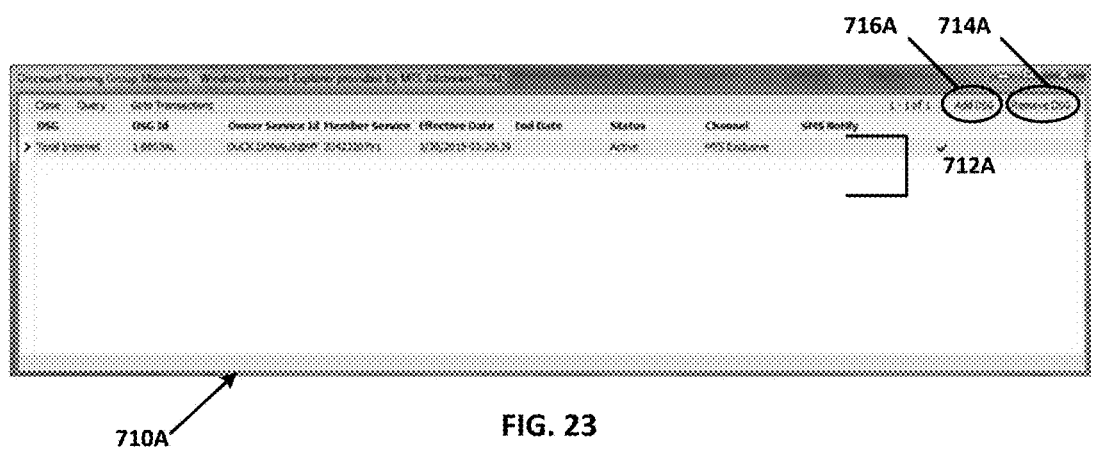
Figure 24:
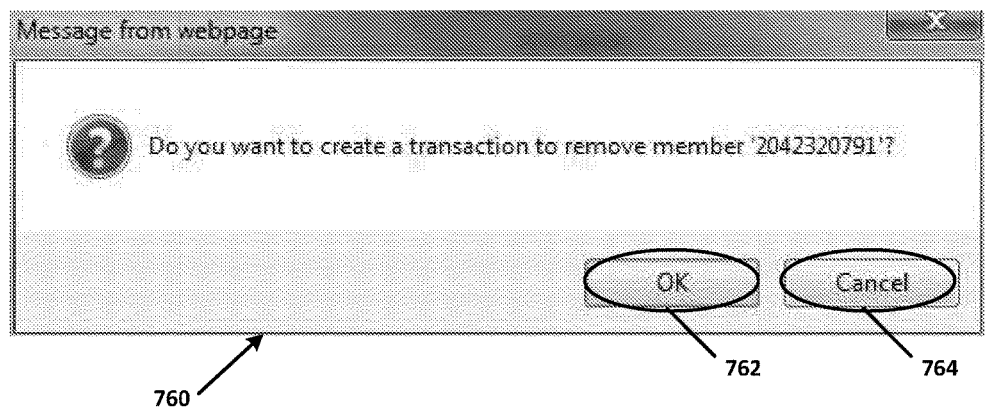

The process of modifying membership in the sharing group to remove the member is similar to, but simpler for the customer service representative than, the above-described process of adding a member through the member's wireless asset view. In this embodiment, as shown in FIG. 23, in response to a selection of a particular entry in the sharing group listing 712A for the particular subscriber via user interface component 710A, the "Remove DSG" button 714A may be selected by the customer service representative. In response, CRM module 10 generates and displays the pop-up user interface component 760, as shown in FIG. 24. User interface component 760 presents a confirmation request for the customer service representative specifying the MDN of the member that, upon continuation, would be removed from the membership of the Total Internet sharing group. Since the member's MDN is specified because the customer service representative has selected the member specifically from the membership list, the customer service representative does not have to go through a process of further specifying the parameters of a remove member transaction. As such, should the customer service representative select the OKAY button 762, CRM module 10 generates and inserts into the Sharing Group Transactions table with a status of Pending a transaction with an Action Code field value of "Remove" and the other fields having similar values to those indicated above in specifying the "Add" transaction. In particular, in this embodiment, referring to Table 3, the field values of the inserted record having an ACTION_CD value of "Remove", a CHANNEL value of "MTS Exclusive", a CREATED value having the current date/time, a DSG_ID corresponding to the Total Internet sharing group identifier specified in the Member/Owner Relationships table in a record associated with the particular subscriber's OWNER_ASSET_ID, a MEMBER_ASSET_ID corresponding to the MDN to be removed, an OWNER_ASSET_ID corresponding to the owner subscriber's service Id, a STATUS_CD of "Pending", a SUBMITTED_DT corresponding to the current date/time, and a TXN_Origin value that is left blank. Pursuant to insertion of the specified transaction into the Sharing Group Transactions table, user interface component 760 is removed from display on the customer service representative's display device and the user interface component 710A is displayed again.

Figure 25:
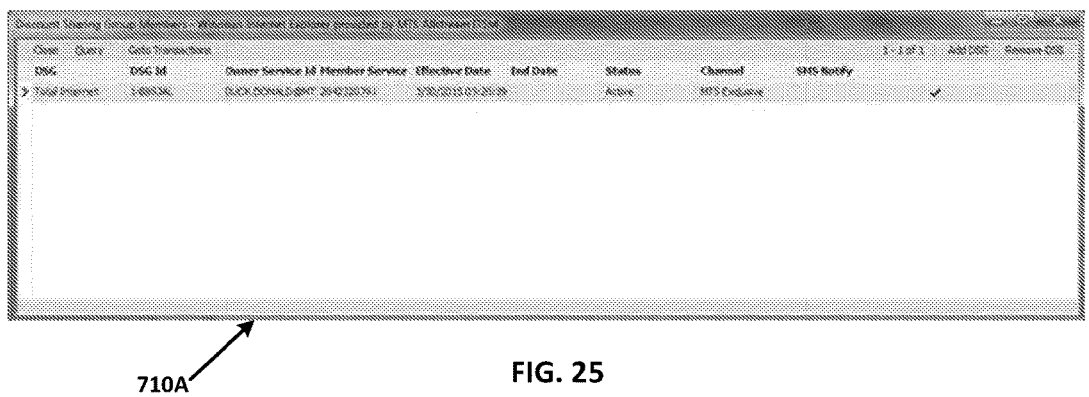

If the customer service representative has selected the CANCEL button 764 then the specified transaction is not inserted into the Sharing Group Transactions table, user interface component 760 is removed from display on the customer service representative's display device and the user interface component 710A is displayed again, as shown in FIG. 25.

After an add or remove transaction has been inserted into the Sharing Group Transactions table in response to requests of the customer service representative by a particular subscriber, the customer service session may be completed with the assurance by the customer service representative to the subscriber that the modifications to the membership of the sharing group have been set in motion. The separate periodic process executed by CRM Module 10 to construct a payload and the further operations downstream of the periodic process to result in modifying the membership of the sharing group described above, proceed as has already been described above.

Although embodiments have been described with reference to the drawings, those of skill in the art will appreciate that variations and modifications may be made without departing from the spirit, scope and purpose of the invention as defined by the appended claims.

For example, while the separate process executed by CRM module 10 as described above is an automatically-run, periodic process, alternatives are possible. For example, CRM Module 10 may be configured to provide access to, and to generate and display, an additional user interface component accessible to an authorized user, such as an authorized customer service representative. Such an additional user interface component would provide user interface component options and tools to search for and select particular transactions that have been inserted into the Sharing Group Transitions table in the CRM database and also to trigger their immediate further processing to construct the payload and so forth.

Furthermore, while embodiments described herein involve CRM, middleware and billing modules, it will be understood that alternatives are possible. For example, alternative implementations of a service delivery system may involve a vertical integration between the billing and CRM modules such that billing tables and records are maintained in the same database as CRM tables and records and billing and CRM functions are integrated into the CRM module. In such an implementation, for the purposes herein, a middleware module would not have to be used to modify membership in a sharing group. As such, the creation of messages incorporating payloads as described herein would not have to be done in order for associations in the billing database between one or more member services and the sharing group to be modified.

What is claimed is:

1. In a service delivery system, a computer-implemented method for maintaining membership in a sharing group associated with a sharable service, the method comprising:
    generating a user interface for displaying current membership in the sharing group;
    receiving, via the user interface, an instruction to modify the current membership; automatically generating and inserting into a transaction table at least one pending modification transaction for the sharing group in accordance with the received instruction;
    constructing a payload based on all pending modification transactions for the sharing group in the transaction table;
    generating and inserting into a middleware messaging queue a message comprising the payload;
    processing the message from the messaging queue to extract the payload;
    modifying associations in a billing database between one or more member services and the sharing group in accordance with the payload extracted from the message; and
    producing a success or failure message for each of the one or member services in the payload based on success or failure of the modifying associations in the billing database.

2. The computer-implemented method of claim 1, further comprising: in the event that the number of member services to be associated with the sharing group is to be changed, stopping and then restarting the sharable service.

3. The computer-implemented method of claim 1, wherein the payload comprises one or more mobile data numbers (MDN) each in association with an ADD or REMOVE instruction.

4. In a service delivery system, a computing system for maintaining membership in a sharing group associated with a sharable service, the system configured to:
    generating a user interface for displaying current membership in the sharing group;
    receiving, via the user interface, instructions to modify the current membership,
    automatically generating and inserting into a transaction table at least one pending modification transaction for the sharing group in accordance with the received instructions;
    constructing a payload based on all pending modification transactions for the sharing group in the transaction table; and
    generating and inserting into a middleware messaging queue a message comprising the payload;
    processing the message from the messaging queue to extract the payload;
    modifying associations in a billing database between one or more member services and the sharing group in accordance with the payload extracted from the message; and
    producing a success or failure message for each of the one or member services in the payload based on success or failure of the modifying associations in the billing database.

5. The system of claim 4, wherein the system is further configured to stop and restart the sharable service in the event that the number of member services to be associated with the sharing group is to be changed.

6. The system of claim 4, wherein the system is further configured to return the success or failure message to the middleware module for each of the one or member services in the payload.

7. The system of claim 4, wherein the payload comprises one or more mobile data numbers (MDN) each in association with an ADD or REMOVE instruction.

8. A non-transitory computer readable medium embodying a computer program executable on a computing system for maintaining membership in a sharing group associated with a sharable service, the computer program comprising:
    computer program code for generating a user interface for displaying current membership in the sharing group;
    computer program code for receiving, via the user interface, an instruction to modify the current membership; and
    computer program code for automatically, in accordance with the instruction:
    generating and inserting into a transaction table at least one pending modification transaction for the sharing group in accordance with the received instruction;
    constructing a payload based on all pending modification transactions for the sharing group in the transaction table;
    generating and inserting into a middleware messaging queue a message comprising the payload;
    processing the message from the messaging queue to extract the payload; and modifying associations in a billing database between one or more member services and the sharing group in accordance with the payload extracted from the message; and producing a success or failure message for each of the one or member services in the payload based on success or failure of the modifying associations in the billing database.

9. The non-transitory computer readable medium of claim 8, further comprising:

computer program code for, in the event that the number of member services to be associated with the sharing group is to be changed, stopping and then restarting the sharable service.

10. The non-transitory computer readable medium of claim 8 wherein the payload comprises one or more mobile data numbers (MDN) each in association with an ADD or REMOVE instruction.

* * * * *